US008281341B2

(12) United States Patent
Ellis et al.

(10) Patent No.: US 8,281,341 B2
(45) Date of Patent: Oct. 2, 2012

(54) SYSTEMS AND METHODS FOR PROVIDING MEDIA GUIDANCE PLANNERS

(75) Inventors: Michael D. Ellis, Boulder, CO (US); Michael L. Craner, Exton, PA (US)

(73) Assignee: Rovi Guides, Inc., Santa Clara, CA (US)

(*) Notice: Subject to any disclaimer, the term of this patent is extended or adjusted under 35 U.S.C. 154(b) by 887 days.

(21) Appl. No.: 11/888,676

(22) Filed: Jul. 31, 2007

(65) Prior Publication Data
US 2008/0059884 A1 Mar. 6, 2008

Related U.S. Application Data

(60) Provisional application No. 60/834,605, filed on Jul. 31, 2006, provisional application No. 60/903,808, filed on Feb. 26, 2007.

(51) Int. Cl.
*H04N 5/445* (2006.01)
*G06F 3/00* (2006.01)
(52) U.S. Cl. ............................. 725/50; 725/56
(58) Field of Classification Search .................. 725/50, 725/58
See application file for complete search history.

(56) References Cited

U.S. PATENT DOCUMENTS

| | | |
|---|---|---|
| 4,071,697 A | 1/1978 | Bushnell et al. |
| 4,706,121 A | 11/1987 | Young |
| 4,872,005 A | 10/1989 | DeLuca et al. |
| 4,977,455 A | 12/1990 | Young |
| 5,224,156 A | 6/1993 | Fuller et al. |
| 5,351,075 A | 9/1994 | Herz et al. |
| 5,353,121 A | 10/1994 | Young et al. |
| 5,410,344 A | 4/1995 | Graves et al. |
| 5,412,720 A | 5/1995 | Hoarty |
| 5,485,197 A | 1/1996 | Hoarty |
| 5,553,221 A | 9/1996 | Reimer et al. |
| 5,557,338 A | 9/1996 | Maze et al. |
| 5,583,560 A | 12/1996 | Florin et al. |
| 5,589,892 A | 12/1996 | Knee et al. |
| 5,594,661 A | 1/1997 | Bruner et al. |
| 5,600,364 A | 2/1997 | Hendricks et al. |
| 5,617,565 A | 4/1997 | Augenbraun et al. |

(Continued)

FOREIGN PATENT DOCUMENTS
EP 0 721 253 7/1996
(Continued)

OTHER PUBLICATIONS

"NDS Opens a New York Office to Focus on Developing Interactive TV Systems and Application for U.S. Market," Business Wire, pp. 1-3, Jan. 24, 2001.

(Continued)

*Primary Examiner* — James R Sheleheda
(74) *Attorney, Agent, or Firm* — Ropes & Gray LLP

(57) ABSTRACT

Systems and methods for providing media planners for planning a user's media content viewing activities are provided. The media planner may include an interactive grid of content with scheduled viewing, recording, or reminders set within a user-selectable time window. The media planner may prioritize content within the planner grid and automatically resolve conflicts when the number of available tuners within the user equipment device has been exceeded. Programs matching a user's viewing interests may also be automatically recorded in the user's absence. Coming-soon announcements may be received for programming outside the current program schedule window. Conditional media guidance application functions may be scheduled based on preliminary availability and attribute data associated with a coming-soon asset.

48 Claims, 27 Drawing Sheets

U.S. PATENT DOCUMENTS

| | | | |
|---|---|---|---|
| 5,623,613 A | 4/1997 | Rowe et al. | |
| 5,629,733 A * | 5/1997 | Youman et al. | 725/53 |
| 5,635,978 A | 6/1997 | Alten et al. | |
| 5,635,989 A | 6/1997 | Rothmuller | |
| 5,659,350 A | 8/1997 | Hendricks et al. | |
| 5,673,089 A | 9/1997 | Yuen et al. | |
| 5,678,170 A | 10/1997 | Grube et al. | |
| 5,680,617 A | 10/1997 | Gough et al. | |
| 5,699,107 A | 12/1997 | Lawler et al. | |
| 5,801,787 A | 9/1998 | Schein et al. | |
| 5,809,204 A | 9/1998 | Young et al. | |
| 5,812,931 A | 9/1998 | Yuen | |
| 5,850,218 A | 12/1998 | LaJoie et al. | |
| 5,886,746 A | 3/1999 | Yuen et al. | |
| 5,940,073 A | 8/1999 | Klosterman et al. | |
| 5,945,988 A | 8/1999 | Williams et al. | |
| 5,986,650 A | 11/1999 | Ellis et al. | |
| 6,002,394 A | 12/1999 | Schein et al. | |
| 6,005,565 A | 12/1999 | Legall et al. | |
| 6,008,802 A | 12/1999 | Iki et al. | |
| 6,016,141 A * | 1/2000 | Knudson et al. | 715/721 |
| 6,061,056 A | 5/2000 | Menard et al. | |
| 6,061,097 A | 5/2000 | Satterfield | |
| 6,133,909 A | 10/2000 | Schein et al. | |
| 6,147,715 A | 11/2000 | Yuen | |
| 6,177,931 B1 | 1/2001 | Alexander et al. | |
| 6,208,335 B1 | 3/2001 | Gordon et al. | |
| 6,216,264 B1 | 4/2001 | Maze et al. | |
| 6,219,839 B1 | 4/2001 | Sampsell | |
| 6,226,444 B1 | 5/2001 | Goldschmidt et al. | |
| 6,226,618 B1 * | 5/2001 | Downs et al. | 705/51 |
| 6,239,794 B1 | 5/2001 | Yuen et al. | |
| 6,247,176 B1 | 6/2001 | Schein et al. | |
| 6,256,071 B1 | 7/2001 | Hiroi | |
| 6,263,501 B1 | 7/2001 | Schein et al. | |
| 6,275,268 B1 | 8/2001 | Ellis et al. | |
| 6,282,713 B1 | 8/2001 | Kitsukawa et al. | |
| 6,289,346 B1 | 9/2001 | Milewski et al. | |
| 6,308,328 B1 | 10/2001 | Bowcutt et al. | |
| 6,324,338 B1 | 11/2001 | Wood et al. | |
| 6,331,877 B1 | 12/2001 | Bennington et al. | |
| 6,369,840 B1 | 4/2002 | Barnett et al. | |
| 6,388,714 B1 | 5/2002 | Schein et al. | |
| 6,418,556 B1 | 7/2002 | Bennington et al. | |
| 6,532,589 B1 | 3/2003 | Proehl et al. | |
| 6,536,041 B1 | 3/2003 | Knudson et al. | |
| 6,539,548 B1 | 3/2003 | Hendricks et al. | |
| 6,542,882 B1 | 4/2003 | Smith | |
| 6,564,378 B1 | 5/2003 | Satterfield et al. | |
| 6,571,390 B1 | 5/2003 | Dunn et al. | |
| 6,614,987 B1 | 9/2003 | Ismail et al. | |
| 6,651,253 B2 | 11/2003 | Dudkiewicz et al. | |
| 6,721,954 B1 | 4/2004 | Nickum | |
| 6,721,956 B2 | 4/2004 | Wasilewski | |
| 6,742,183 B1 | 5/2004 | Reynolds | |
| 6,756,997 B1 | 6/2004 | Ward et al. | |
| 6,757,906 B1 | 6/2004 | Look et al. | |
| 6,810,526 B1 | 10/2004 | Menard et al. | |
| 6,813,777 B1 | 11/2004 | Weinberger et al. | |
| 6,865,746 B1 | 3/2005 | Herrington et al. | |
| 6,868,225 B1 | 3/2005 | Brown et al. | |
| 6,897,904 B2 | 5/2005 | Potrebic et al. | |
| 6,898,762 B2 | 5/2005 | Ellis | |
| 6,909,708 B1 | 6/2005 | Krishnaswamy et al. | |
| 6,943,845 B2 | 9/2005 | Mizutome et al. | |
| 7,003,791 B2 | 2/2006 | Mizutani | |
| 7,013,478 B1 | 3/2006 | Hendricks et al. | |
| 7,017,172 B2 | 3/2006 | Schaffer et al. | |
| 7,055,166 B1 | 5/2006 | Logan et al. | |
| 7,136,829 B2 | 11/2006 | Hellal et al. | |
| 7,152,236 B1 | 12/2006 | Wugofski et al. | |
| 7,165,098 B1 | 1/2007 | Boyer et al. | |
| 7,185,355 B1 | 2/2007 | Ellis | |
| 7,206,892 B2 * | 4/2007 | Kim et al. | 711/100 |
| 7,213,089 B2 | 5/2007 | Hatakenaka | |
| 7,231,607 B2 | 6/2007 | Neely et al. | |
| 7,260,823 B2 | 8/2007 | Schlack et al. | |
| 7,283,992 B2 | 10/2007 | Liu et al. | |
| 7,296,284 B1 | 11/2007 | Price et al. | |
| 7,334,195 B2 | 2/2008 | Gemmell et al. | |
| 7,343,614 B1 | 3/2008 | Hendricks et al. | |
| 7,386,871 B1 | 6/2008 | Knudson et al. | |
| 7,458,093 B2 * | 11/2008 | Dukes et al. | 725/141 |
| 7,496,941 B2 | 2/2009 | Russo | |
| 7,603,685 B2 | 10/2009 | Knudson et al. | |
| 7,657,907 B2 | 2/2010 | Ferman et al. | |
| 7,673,314 B2 | 3/2010 | Ellis et al. | |
| 7,690,019 B2 | 3/2010 | Yamamoto et al. | |
| 7,694,319 B1 | 4/2010 | Hassel et al. | |
| 7,738,765 B2 | 6/2010 | Matsuno et al. | |
| 7,761,892 B2 | 7/2010 | Ellis et al. | |
| 7,783,632 B2 | 8/2010 | Richardson et al. | |
| 7,825,987 B2 | 11/2010 | Yui et al. | |
| 7,861,258 B2 * | 12/2010 | Barton et al. | 725/28 |
| 7,895,624 B1 | 2/2011 | Thomas et al. | |
| 7,958,533 B2 | 6/2011 | Kikinis et al. | |
| 2001/0047298 A1 | 11/2001 | Moore | |
| 2002/0026496 A1 | 2/2002 | Boyer et al. | |
| 2002/0035697 A1 | 3/2002 | McCurdy et al. | |
| 2002/0042913 A1 | 4/2002 | Ellis | |
| 2002/0056119 A1 | 5/2002 | Moynihan | |
| 2002/0059610 A1 | 5/2002 | Ellis | |
| 2002/0059621 A1 | 5/2002 | Thomas et al. | |
| 2002/0075402 A1 | 6/2002 | Robson et al. | |
| 2002/0078447 A1 | 6/2002 | Mizutome et al. | |
| 2002/0078453 A1 | 6/2002 | Kuo | |
| 2002/0108113 A1 | 8/2002 | Schaffer et al. | |
| 2002/0112239 A1 | 8/2002 | Goldman | |
| 2002/0120507 A1 | 8/2002 | Chanos et al. | |
| 2002/0124247 A1 | 9/2002 | Houghton | |
| 2002/0129368 A1 | 9/2002 | Schlack et al. | |
| 2002/0157099 A1 | 10/2002 | Schrader et al. | |
| 2002/0165770 A1 | 11/2002 | Khoo et al. | |
| 2002/0174430 A1 | 11/2002 | Ellis et al. | |
| 2002/0194600 A1 | 12/2002 | Ellis et al. | |
| 2003/0005445 A1 | 1/2003 | Schein et al. | |
| 2003/0093792 A1 | 5/2003 | Labeeb et al. | |
| 2003/0093803 A1 | 5/2003 | Ishikawa et al. | |
| 2003/0110163 A1 | 6/2003 | Chen | |
| 2003/0110499 A1 | 6/2003 | Knudson et al. | |
| 2003/0126600 A1 | 7/2003 | Heuvelman | |
| 2003/0131355 A1 | 7/2003 | Berenson | |
| 2003/0131356 A1 | 7/2003 | Proehl et al. | |
| 2003/0149621 A1 | 8/2003 | Shteyn | |
| 2003/0149980 A1 | 8/2003 | Hassell et al. | |
| 2003/0154478 A1 | 8/2003 | Hassell et al. | |
| 2003/0167467 A1 | 9/2003 | Allen et al. | |
| 2003/0177497 A1 | 9/2003 | Macrae et al. | |
| 2003/0182658 A1 | 9/2003 | Alexander | |
| 2003/0196201 A1 | 10/2003 | Schein et al. | |
| 2003/0225777 A1 | 12/2003 | Marsh | |
| 2004/0003391 A1 | 1/2004 | Gutta et al. | |
| 2004/0025180 A1 | 2/2004 | Begeja et al. | |
| 2004/0064835 A1 | 4/2004 | Bellwood et al. | |
| 2004/0068745 A1 | 4/2004 | Yamamoto et al. | |
| 2004/0073918 A1 | 4/2004 | Ferman et al. | |
| 2004/0096184 A1 | 5/2004 | Poslinski | |
| 2004/0103434 A1 | 5/2004 | Ellis | |
| 2004/0103437 A1 | 5/2004 | Allegrezza et al. | |
| 2004/0117831 A1 * | 6/2004 | Ellis et al. | 725/53 |
| 2004/0128685 A1 | 7/2004 | Hassel | |
| 2004/0128686 A1 | 7/2004 | Boyer | |
| 2004/0139047 A1 | 7/2004 | Rechsteiner et al. | |
| 2004/0177370 A1 | 9/2004 | Dudkiewicz | |
| 2004/0210926 A1 | 10/2004 | Francis et al. | |
| 2004/0210932 A1 | 10/2004 | Mori et al. | |
| 2004/0239812 A1 | 12/2004 | Park et al. | |
| 2005/0015405 A1 | 1/2005 | Plastina et al. | |
| 2005/0028208 A1 | 2/2005 | Ellis et al. | |
| 2005/0028218 A1 | 2/2005 | Blake | |
| 2005/0120373 A1 | 6/2005 | Thomas et al. | |
| 2005/0158023 A1 | 7/2005 | Takasu et al. | |
| 2005/0160461 A1 | 7/2005 | Baumgartner et al. | |
| 2005/0204388 A1 | 9/2005 | Knudson et al. | |
| 2005/0210530 A1 | 9/2005 | Horvitz et al. | |
| 2005/0235319 A1 | 10/2005 | Carpenter et al. | |
| 2005/0251827 A1 | 11/2005 | Ellis et al. | |

| | | |
|---|---|---|
| 2005/0259963 A1 | 11/2005 | Sano et al. |
| 2005/0278741 A1 | 12/2005 | Robarts et al. |
| 2005/0278768 A1 | 12/2005 | Boyer et al. |
| 2006/0026635 A1 | 2/2006 | Potrebic et al. |
| 2006/0026648 A1* | 2/2006 | Kirihara et al. .................. 725/58 |
| 2006/0026665 A1 | 2/2006 | Rodriguez et al. |
| 2006/0053449 A1 | 3/2006 | Gutta |
| 2006/0173838 A1 | 8/2006 | Garg et al. |
| 2006/0218573 A1 | 9/2006 | Proebstel |
| 2006/0218604 A1 | 9/2006 | Riedl et al. |
| 2006/0236360 A1 | 10/2006 | Yuen et al. |
| 2006/0253874 A1 | 11/2006 | Stark et al. |
| 2006/0271953 A1 | 11/2006 | Jacoby et al. |
| 2006/0294073 A1 | 12/2006 | Hamadi |
| 2006/0294574 A1 | 12/2006 | Cha |
| 2007/0039023 A1 | 2/2007 | Kataoka |
| 2007/0055989 A1 | 3/2007 | Shanks et al. |
| 2007/0067271 A1 | 3/2007 | Lu |
| 2007/0074245 A1 | 3/2007 | Nyako et al. |
| 2007/0078822 A1 | 4/2007 | Cucerzan et al. |
| 2007/0089132 A1 | 4/2007 | Qureshey et al. |
| 2007/0112740 A1 | 5/2007 | Geva |
| 2007/0130089 A1 | 6/2007 | Chiu |
| 2007/0162502 A1 | 7/2007 | Thomas et al. |
| 2007/0162850 A1 | 7/2007 | Adler et al. |
| 2007/0169148 A1 | 7/2007 | Oddo et al. |
| 2007/0186240 A1 | 8/2007 | Ward et al. |
| 2007/0214132 A1 | 9/2007 | Grubb et al. |
| 2007/0277218 A1 | 11/2007 | Borden |
| 2008/0092155 A1 | 4/2008 | Ferrone et al. |
| 2008/0092156 A1 | 4/2008 | Ferrone et al. |
| 2008/0104057 A1 | 5/2008 | Billmaier et al. |
| 2008/0104127 A1 | 5/2008 | Billmaier et al. |
| 2008/0184294 A1 | 7/2008 | Lemmons et al. |
| 2010/0107194 A1* | 4/2010 | McKissick et al. ............. 725/40 |
| 2010/0131983 A1 | 5/2010 | Shannon et al. |
| 2010/0153885 A1 | 6/2010 | Yates |
| 2010/0175092 A1 | 7/2010 | Kikinis et al. |
| 2010/0287590 A1 | 11/2010 | Knudson |

FOREIGN PATENT DOCUMENTS

| | | |
|---|---|---|
| EP | 0 848 554 | 6/1998 |
| EP | 0 854 645 | 7/1998 |
| EP | 1363452 | 11/2003 |
| EP | 1 463 307 | 9/2004 |
| JP | 09-037233 | 2/1997 |
| WO | WO 97/13368 | 4/1997 |
| WO | WO 98/26584 | 6/1998 |
| WO | WO 98/27723 | 6/1998 |
| WO | WO 98/43183 | 10/1998 |
| WO | WO 99/01984 | 1/1999 |
| WO | WO 99/04561 | 1/1999 |
| WO | WO 00/38428 | 6/2000 |
| WO | WO 0033576 | 6/2000 |
| WO | WO 01/15438 | 3/2001 |
| WO | WO-0191458 | 11/2001 |
| WO | WO 2008/016617 | 2/2008 |

OTHER PUBLICATIONS

"TiVo Viewer's Guide: How to Activate and Use Your TiVo Service," SDOC-00057-000 Rev. B, 2002.

Hogan, "ShopNBC Winks at ITV," Multichannel News, pp. 1-2, Jun. 25, 2001.

Shaw, "The Interactive Living Revolution," Multichannel News, pp. 1-3, Mar. 31, 2003.

Susanne Boll, Utz Westermann: "Meeting Experience: Mediæther: An Event Space for Context-Aware Multimedia Experiences," Proceedings of the 2003 ACM SIGMM Workshop on Experiential Telepresence ETP '03, Online Nov. 7, 2003, pp. 21-30, XP002434278, Berkley, California, ISBN: 1-58113-775-3, Retrieved from the internet—URL: http://delivery.acm.org/10.1145/990000/982488/p21-boll.pdf?key1=982488&key2=9969139711&coll=portal&dl=ACM&CFID=2181828&CFTOKEN=68827537>, retrieved on May 16, 2007.

Waltner, "Cable Nets Eye New Interactive Services (Interactive Television)," Multichannel News, pp. 3-5, Feb. 23, 1998.

Van Barneveld et al., "Designing Usable Interfaces for TV Recommender Systems," Personalized Digital Television, 6:259-286 (2004) XP-002417580 pp. 1-28.

* cited by examiner

COMING SOON

Capote (2005) ★★★

(Biography drama) R

WATCH THE SOPRANOS!
SEASON 6 FINALE
JUNE 10 AT 7PM ON
14 HBO

April — VOD — Phili...

Sort By: — 902
- Projected Date — 904
- Genre — 906
- Title — 908
- (Source) — 910
- Reliability — 912
- Rating — 914
  ▶ 916

...Mountain    ✓✓✓ April
...nos         ✓ April
...Awards      ✓✓ March
...ommandments ✓✓ 3/5
               Spring
               ✓✓✓ March

TV PLANNER

The West Wing     9 KUSA 7-8p     TV-14 ○

New, (2006), Tension grips the White House as terrorists ...

Entourage is back with an all-new season!

HBO

| Sun 3/19 ◀ | 7:00pm | 7:30pm | 8:00pm ▲ |
|---|---|---|---|
| VOD | Entourage: Vince's ... | 🛡 | Deadwood |
| 13 KDVR | Simpsons ○ | War at Home | Family Guy |
| 9 KUSA | The West Wing | ⊘ | Law ... ○ |
| 13 KDVR | Simpsons | War at ... ○ | Family Guy |
| 2 KGWN | Charmed | | |

Press PAGE UP to increase program priority ▼

TV PLANNER

The West Wing     9 KUSA 7-8p     TV-14 ○

New, (2006), Tension grips the White House as terrorists ...

WATCH THE SOPRANOS! SEASON 6 FINALE JUNE 10 AT 7PM ON 14 HBO

| Sun 3/19 | ◀ 7:00pm | 7:30pm<br>1802 | 8:00pm<br>1804 |
|---|---|---|---|
| DVR | The Best of ... | Deadwood | |
| 13 KDVR | Simpsons ○ | War at Home | Family Guy |
| 9 KUSA | The West Wing | ⊘ | Law ... ○ |
| 13 KDVR | Simpsons ○ | War at ... | Family Guy |
| 2 KGWN | Charmed | 🔔 | |

Press PAGE UP to increase program priority

SYSTEMS AND METHODS FOR PROVIDING MEDIA GUIDANCE PLANNERS

CROSS-REFERENCE TO RELATED APPLICATIONS

This application claims the benefit of U.S. Provisional Application Nos. 60/834,605, filed Jul. 31, 2006 and 60/903,808, filed Feb. 26, 2007, both of which are hereby incorporated by reference herein in their entireties.

BACKGROUND OF THE INVENTION

This invention relates generally to media systems and, more particularly, to media systems with enhanced media guidance support for future media attractions, and media planners.

An interactive media guidance application, such as an interactive television program guide, allows a user to tune to and display a wide array of media content that is available within a media system. Interactive media guidance applications may also allow users to perform numerous media guidance application functions relating to available content. For example, the user may schedule a recording of future programming (e.g., a series recording), set a reminder, or bookmark content of interest.

Some media guidance applications, however, are limited in their ability to perform media guidance application functions on future programming or coming attractions. For example, typical media guidance applications download an advance window of program schedule data and use this program schedule data to display program schedule listings for content available within the program schedule window (e.g., content available within the next fourteen days of available programming). This downloaded program schedule data allows the media guidance application to display program schedule listings, schedule recordings, and perform other related media guidance application functions on content identified in the schedule. Performing media guidance application functions on programming available outside the downloaded schedule window is severely limited because little or no information is generally available for this programming. In addition, any information that may be available is subject to frequent changes or revisions by the content or service provider, media vendor or distributor, or multiple service operator (MSO). This often results in incorrect or quickly outdated information.

It is also sometimes difficult for users of a user equipment device to determine what media guidance application functions are scheduled to be executed during any given time period on the user equipment device. For example, the user may have manually scheduled one or more recordings during a certain time period, and the interactive media guidance application may be configured to automatically record one or more programs (e.g., episodes of a season pass recording) during the same time period. The user may not be able to easily discern the number and type of media guidance application functions that are scheduled to be executed at any given time. Therefore, there is the possibility of unforeseen conflicts due to, for example, the number of available tuners in the user equipment device.

SUMMARY OF THE INVENTION

In view of the foregoing, a more flexible solution for scheduling and planning future media content viewing is provided. Users may view a comprehensive, visual plan of all their scheduled media content activities (e.g., all scheduled recordings and reminders) from one centralized media planner application. The media planner application may also automatically detect and resolve scheduling conflicts (e.g., tuner conflicts) associated with the user's planned media content activities. The media planner may automatically assign preemption priorities to the user's scheduled activities, and the user may change the assigned preemption priorities by dragging or moving the listings up or down in the planner. The preemption priorities of the scheduled activities may define the order in which activities are preempted by other scheduled activities (e.g., in the event of a conflict, such as a lack of available tuners). In this way, the user may be presented with a listing of activities that will actually be carried out on the user equipment device and activities that may be preempted due to conflicts. The impact a change in the preemption priority will have on other scheduled activities may also be displayed to the user in the media planner.

The planner may allow the user to add listings for content available within the current program schedule listings window as well as content identified in a coming-soon database. The planner may take the form of an interactive grid of content listings sorted by preemption priority. The user may adjust the preemption priority of a listing by moving the content to a new location (e.g., up or down) in the planner grid. Content with a higher preemption priority may preempt content with lower preemption priority. For example, if three content selections are scheduled for recording during the same time period and only two tuners are available for recording, the content selections with the two highest priorities may be recorded. Listings for content selections that may be preempted due to a tuner conflict may be visually distinguished from other listings (e.g., the listings may be grayed out, displayed with an icon indicating unavailability, displayed in a smaller font, or displayed in a font of a different color) in the planner grid.

A user may plan his or her viewing schedule in the planning grid. Non-linear content, such as on-demand and locally recorded content, may be added to the grid and scheduled for viewing like traditional, linear content (e.g., broadcast television content). Some non-linear content in the grid may be viewed without commercial interruptions. For example, the commercials may be extracted from the content (or automatically skipped) using data parsed from commercial status flags and/or by analyzing the black frame interval or other audio/video characteristics of the content. Since the duration of the non-linear content may be shorter without commercials, in some embodiments the planner may automatically pack the planner grid to account for the new duration. This way, other content may be planned for viewing or recording immediately after the non-linear content is displayed without commercials. In some of these cases, the new duration may be estimated using typical commercial break percentages customary for the program, network, or industry. In some cases, non-linear content may be watched in more than one session and its duration, for planning purposes, may be treated differently as a result. For example, if a user watches one hour of a three-hour program, in some embodiments, an option may be provided within the media planner wherein the system will display the program as having a (e.g., remaining) duration of only two hours.

A user may move a listing for a linear asset to a later time in the planner grid in order to resolve a planner conflict. If the user time-shifts a linear asset, a recording for the asset may be automatically set or scheduled on the user equipment so that it may be displayed at the new time. In some embodiments, the media planner automatically recommends to the user the most efficient viewing schedule (i.e., the viewing schedule with the fewest conflicts) so that the user may maximize the number of successfully viewed or recorded selections. A user may also manually adjust the start or end point of a scheduled viewing or recording. While viewing the planning grid, the viewer may decide to extend or shorten the end point or start point of the program, for example by selecting and moving the left or right edge of the program's cell in the grid.

The media planner application also allows busy users to plan a schedule of their future media viewing so that important shows and programs are not missed. External commitments may then be planned around scheduled media viewing (or alternatively the user's media viewing may be planned around the user's external commitments). This may be one way for content providers to help increase viewership because fewer people may miss planned programming. In addition, advance notification of programming available outside the current program data schedule window helps spread "buzz" about an upcoming attraction.

The media planner may include scheduled activities for "coming-soon" content. Third-party media content vendors, television broadcasters, and other content and service providers and distributors (collectively referred to herein as "content providers") may provide coming-soon announcements for upcoming media content that may become available to the user equipment device at some future time. The announcements may be for media content being broadcast (or otherwise made available, for example, via on on-demand service) outside the current window of program schedule data (e.g., beyond the fourteen day schedule window). The announcements may take a standard announcement record format and may be compatible with traditional program schedule information, allowing the coming-soon announcements to be displayed, for example, in traditional program grid guides. In some embodiments, the coming soon announcements may support approximate schedule information. For example, an upcoming program may be announced for a season, a month, a day without a time, or other suitable approximate time, or it may have no predicted or estimated availability date.

In some embodiments, coming-soon announcements may be manually uploaded to a supplemental data source for delivery to user equipment devices. Web scripting or remote API function calls may also be used to automatically compose and send coming-soon announcements to a supplemental data source (or directly to the user equipment devices). For example, in some embodiments, content providers may customize the announcement details using a web interface. The interface may be linked to a production schedule database so that production schedule changes are automatically reflected in the coming-soon announcements. Announcement updates may then be sent periodically to the user equipment devices to update or revise any information related to the announcement, including the availability of the content (i.e., the scheduled availability date and time, or a more precise prediction of the availability date), the scheduled duration, the rating, or any other content attribute.

In some embodiments, coming-soon announcements may also include advanced content control flags which may restrict the user's ability to record (or otherwise interact with) the content after it is made available to the user equipment device. For example, the content control flags may prohibit or restrict transcoding or reformatting the content to other formats or versions. The content control flags may also prohibit editing, copying, or retransmission of the content. This may protect the integrity of the content while maintaining copyright control.

The content control flags may also include flags for automatically recording the content, automatically setting a reminder for the content, or automatically bookmarking the content on the user equipment device. The scheduled recording, reminder, or bookmark may be set immediately after receiving the coming-soon announcement or after the content becomes available. The interactive media guidance application may process coming-soon announcements, including any advanced content control flags, as soon as they are received. Alternatively, announcements may be processed in batches after a predetermined number of announcements has been received. One or more coming-soon databases may be created on the user equipment device to store the coming-soon information in the coming-soon announcements. Storage of the coming soon announcement information as well as user decisions (e.g., record, ignore, set reminder, or set bookmark) regarding these announcements may be stored on the user equipment device, the network, or a combination of both the user equipment device and the network, in various embodiments. In this way, information for these special upcoming events and coming soon attractions may be accessed even though the dates for these events may be outside the current program listings schedule window (e.g., for a date outside the program listings database holdings) for the user equipment device (e.g., beyond fourteen days).

An interactive element (such as an interactive advertisement or interactive listing) associated with coming-soon programming may be displayed to the user in any suitable display screen. The user may select the interactive element to automatically set a reminder, schedule a recording, set a bookmark, or perform any other suitable media guidance application function on the coming-soon programming. These reminders and recordings may be automatically adjusted after an announcement update identifies a change in the availability of the programming. For example, the start time of the coming-soon programming may be changed from 6 PM to 8 PM due to an unforeseen network scheduling conflict. Alternatively, a more specific availability date and time may be made available. For example, an announcement with only a date specified may be updated to include a date and a time. An announcement update may be sent to the user equipment device to update the announcement database and corresponding recordings and reminders set for the coming-soon content.

A unique program identifier may also be associated with each coming-soon content selection. This unique program identifier may be saved with each media guidance application function scheduled for the coming-soon content selection. The interactive media guidance application may then monitor the downloaded window of program schedule data that is used to display program schedule listings for content available within the program schedule window. If the unique program identifier associated with a coming-soon content selection matches the program identifier in the downloaded window of program schedule data, the availability information (as well as other content attributes) of the coming-soon content selection may be automatically reconciled with the information in the downloaded window of program schedule data. This may cause any scheduled media guidance application functions associated with the coming-soon content to be automatically updated to reflect the data in the downloaded window of program schedule data.

Conditional media guidance application functions may be created by selecting the interactive element (e.g., interactive advertisement or interactive listing) associated with the coming-soon programming. The conditional media guidance application functions may be conditioned on one or more content attributes of the coming-soon content being true at the content availability time (e.g., the actual broadcast time or release date). Compound logic expressions may be created by the user for more advanced conditional function control.

The user may select to view coming-soon information from one or more sources. Each source may be associated with its own coming-soon database stored at the user equipment device or at a headend server. After selecting the coming-soon source, a listing or grid of program schedule information relating to coming-soon content associated with the selected source may be displayed. The listing or grid may be sorted or filtered by any suitable criterion or combination of criteria.

BRIEF DESCRIPTION OF THE DRAWINGS

The above and other features of the present invention, its nature and various advantages will be more apparent upon consideration of the following detailed description, taken in conjunction with the accompanying drawings, and in which:

FIG. 9 shows an illustrative coming-soon sorting overlay in accordance with one embodiment of the invention;

FIG. 15 shows an illustrative planner display screen with on-demand row in accordance with one embodiment of the invention;

FIG. 18 shows an illustrative packed planner grid in accordance with one embodiment of the invention;

DETAILED DESCRIPTION

The media planner feature and associated functionality described herein may be provided by a stand-alone media planner application executing at least partially on a user equipment device, or the features and functionality may be provided by a media planner module or mode of an existing interactive application. If implemented as a media planner module or mode of an existing interactive application, such as an interactive media guidance application, all the display screens, prompts, and overlays shown herein may be integrated with the display screens, prompts, and overlays of the existing application. For example, fonts, colors, and overall layouts may be changed from those depicted to better match the fonts, colors, and overall layouts of the already existing application. Although any type of application may perform the media planner functionality described herein, for convenience this application is referred to as an interactive media guidance application or media planner application.

The media planner application may allow users to plan or schedule their media content activities (e.g., recordings and reminders) in advance of actually performing the activities. For example, users may plan next week's media content viewing using an intuitive, easy-to-use interface. A media planner grid may include interactive listings for assets scheduled for recording and assets with active reminders set for the planner grid time window. One or more of these listings may be for coming-soon content that is not identified or scheduled in the current program guide schedule listing window. Users may drag new listings for linear (e.g., broadcast) and non-linear (e.g., on-demand and locally recorded) content into the planner grid in order to schedule the content for viewing or recording. Preemption priorities may also be assigned to content with overlapping schedules. Some content in the planner grid may be automatically recorded, depending on its priority and the number of available tuners in the user equipment device.

Figure 1:
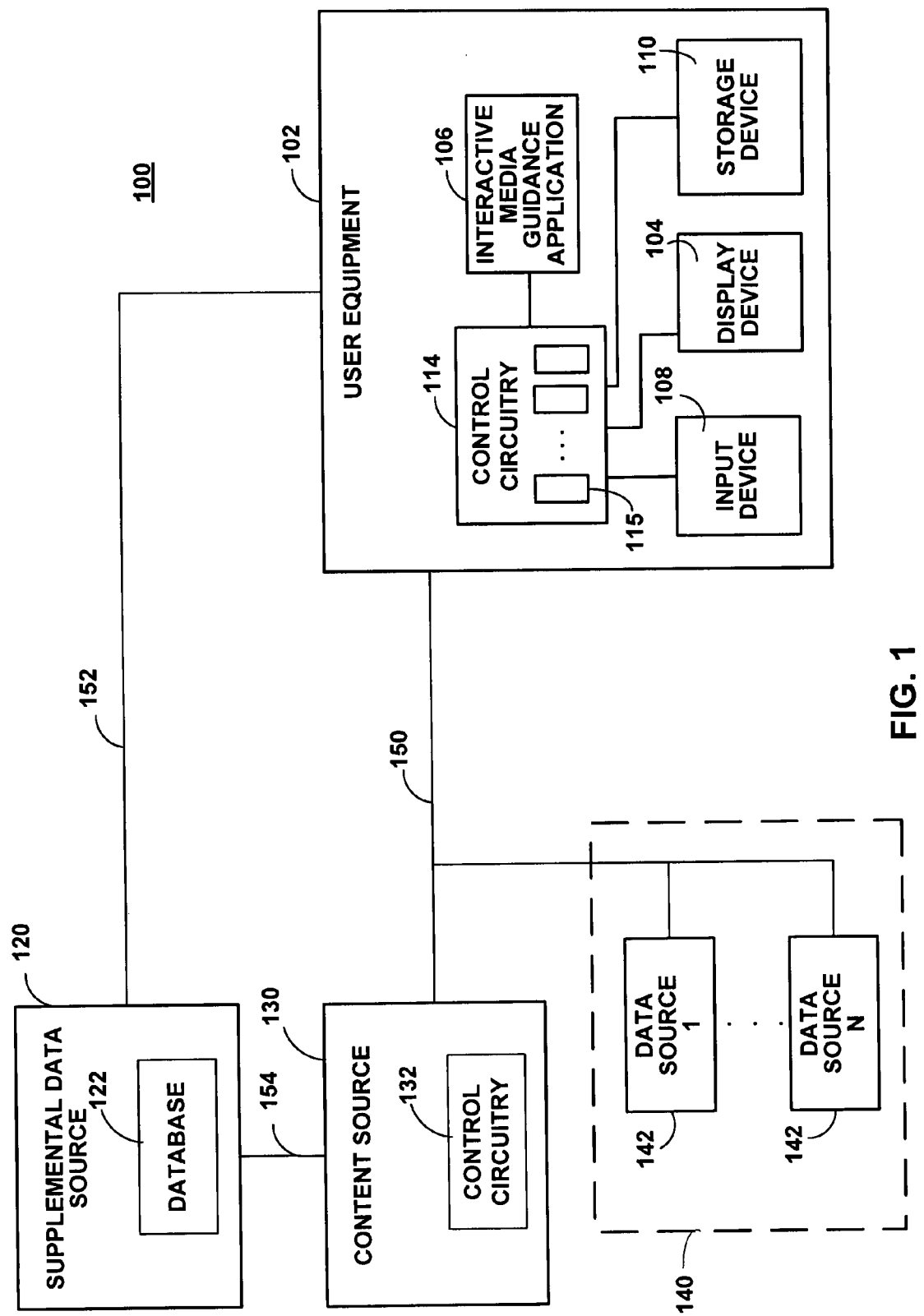
FIG. 1 is an illustrative block diagram of a media system in accordance with one embodiment of the invention.

FIG. 1 shows illustrative interactive media system 100 for performing the media planner functionality in accordance with one embodiment of the invention. User equipment device 102 receives content in the form of signals from content source 130 and/or supplemental data source 120 over communications paths 150 and 152, respectively. Any suitable number of users may have one or more user equipment devices, such as user equipment 102, coupled to content source 130, data sources 140, and supplemental data source 120. For the clarity of the figure, however, only a single user equipment device is shown. In addition, although in practice there may be numerous instances of content source 130 and supplemental data source 120, for clarity only one instance of each source has been shown in the example of FIG. 1.

Content source 130 may be any suitable source of media content, such as, for example, a cable system headend, satellite television distribution facility, television broadcast facility, on-demand server (e.g., video-on-demand (VOD) server), Internet or network media/web server, or any other suitable facility or system for originating or distributing passive or interactive content to user equipment 102. Media content that may be provided by content source 130 to user equipment 102 includes broadcast programming, VOD programming, digital music, news, interactive applications (e.g., interactive games), Internet resources and web services (e.g., websites, newsgroups, and chat rooms), and any other content capable of being displayed by, presented to, recorded, or interacted with, using user equipment 102.

Supplemental data source 120 may be any suitable data source configured to provide schedule information about coming-soon attractions to user equipment 102. For example, as shown in more detail in FIGS. 2 and 3, described below, content providers may send coming-soon announcements to supplemental data source 120 for storage in one or more instances of database 122. Supplemental data source 120 may also store editorial ratings, popularity ratings, purchase price information, content summaries, and other suitable information about coming attractions in database 122. For example, Nielsen ratings information or box office revenues (or any other network popularity statistics) may be made available on supplemental data source 120. Ratings may include objective ratings based on, for example, network access statistics, as well as subjective ratings based on editorial programming picks. For example, editors or celebrities may rate their favorite programming using a number, point, star, grade, or any other suitable rating system. In addition, editors may associate collections of programs with one or more affinity groups. Users subscribed to an affinity group may submit user ratings pertaining to any content associated with the group. The editorial and user ratings may be stored on supplemental data source 120 for access by user equipment device 102 at any suitable time. Additionally or alternatively, ratings information may be automatically delivered to user equipment 102 periodically or continuously, as network bandwidth permits.

In addition, network statistics from a switched digital video (SDV) manager, remote recording manager, or video-on-demand server (or any other network monitor or network manager) may be stored on supplemental data source 120 for access by user equipment device 102. The SDV manager or VOD server may provide data reflecting the number, frequency, and/or identity of content access requests from other users in the local service group. This information may then be stored on supplemental data source 120 (e.g., in database 122) and used by interactive media guidance application 106 to determine the popularity of content available within the network at any given moment based, at least in part, on the total number of network access requests, the duration of the access, or any other suitable criteria.

Database 122 may also store network viewing statistics of all users in media system 100 (not just in the user's local service group). By accessing network viewing statistics, user equipment 102 may determine what content is currently being watched by a large number of viewers. This may be used as an indication of the popularity of the content.

In some embodiments, database 122 may also store the interactive media guidance application (or a stand-alone media planner application) itself. Upon receiving a request from user equipment 102, supplemental data source 120 may transmit the interactive media guidance application directly to user equipment 102 via communications path 152 (or supplemental data source 120 may transmit the interactive media guidance application to content source 130 for transmission to user equipment 120, if desired). In one embodiment, the interactive media guidance application is an Open-Cable Applications Platform ("OCAP") application downloaded by middleware to user equipment 102. User equipment 102 (or a proxy acting on behalf of the user equipment) may periodically query supplemental data source 120 for application updates, or supplemental data source 120 may push application updates to user equipment 102 automatically as updates become available.

Content source 130 and supplemental data source 120 may be configured to transmit signals to user equipment 102 over any suitable communications paths 150 and 152 including, for example, a satellite path, a fiber-optic path, a cable path, or any other suitable wired or wireless path. The signals may be transmitted as a broadcast, multicast, unicast, or any other suitable transmission stream. Content source 130 may also include control circuitry 132 for performing operations on the signals transmitted by content source 130, such as, for example, generating new signals or communicating with user equipment 102 to provide on-demand functionality.

User equipment 102 may receive interactive application data from one or more instances of data sources 140, content source 130, and supplemental data source 120. Data sources 140 may provide data for a particular type of content or for a particular application running on user equipment 102. For example, one data source 142 may provide data for interactive media guidance application 106 (including data for the media planner module of the application) and another data source may provide data for an interactive home shopping application. In some embodiments, data sources 140 may provide data to the applications running on user equipment 102 using a client-server model. In some embodiments, data sources 140 may provide data to the applications running on user equipment 102 using a data carousel such as the data carousel specified in "Enhanced TV Application Messaging Specification," OC-SP-ETV-AM-I02-050727, published by Cable Television Laboratories, Inc. and hereby incorporated herein by reference in its entirety. There may be one server per data source, one server for all sources, or, in some embodiments, a single server may communicate as a proxy between user equipment 102 and various data sources 140.

Content source 130, supplemental data source 120, and data sources 140 are shown in FIG. 1 as separate elements. In practice, their functionality may be combined into a single mechanism and provided from a single system at a single facility, or their functionality may be provided by multiple systems at multiple facilities. For example, supplemental data source 120, content source 130, and data sources 140 may be combined to provide broadcast television content and associated broadcast television data, including ratings, genre, and content summary information, or other suitable information to user equipment 102.

User equipment 102 may include any equipment suitable for presenting media content to a user. For example, user equipment 102 may include computer equipment, such as a personal computer with a television card (PCTV) and/or Open Cable Unidirectional Receiver (OCUR). User equipment 102 may also include television equipment such as a television and set-top box, a recording device, a video player, a user input device (e.g., remote control, a keyboard, a mouse, a touch pad, a touch screen, and/or a voice recognition/verification module) or any other device suitable for providing a complete, interactive experience. For example, user equipment 102 may include a DCT 2000, 2500, 5100, 6208 or 6412 set-top box provided by Motorola, Inc.

In the example of FIG. 1, user equipment 102 includes control circuitry 114, display device 104, interactive media guidance application 106, storage device 110, and user input device 108, all of which may be implemented as separate devices or as a single, integrated device. In addition to interactive media guidance application 106, other interactive applications, such as an interactive home shopping application, may be implemented on user equipment 102. In some embodiments, these interactive applications may, for example, direct a tuner in control circuitry 114 to display, on display device 104, the content transmitted by content source 130 over communications path 150 and to provide interactive application features.

Display device 104 may be any suitable device capable of presenting human-perceivable media, such as, for example, a television monitor, computer monitor, LCD display, video projection device, holographic projector, or virtual reality simulator. Display device 104 may also be configured to provide audio and other sensory output.

Control circuitry 114 is adapted to receive user input from input device 108, execute the instructions of interactive media guidance application 106, execute the instructions of any other interactive applications, and direct display device 104 to display media content and interactive application display screens and overlays. Control circuitry 114 may include one or more tuners 115 (e.g., analog or digital tuners), encoders and decoders (e.g., MPEG encoders and decoders), processors (e.g., MIPs and/or Motorola 68000 family processors), memory (e.g., RAM, ROM, flash memory, and hard disks), communications circuitry (e.g., cable modem and ATSC 256QAM receiver circuitry), input/output circuitry (e.g., graphics circuitry), connections to the various devices of user equipment 102 (e.g., storage device 110), and any other suitable components for providing analog or digital television programming, Internet content, and coming-soon listings. In one embodiment, control circuitry 114 may be included as part of one of the devices of user equipment 102 such as, for example, part of display 104 or any other device (e.g., a set-top box, television, and/or video player).

Control circuitry 114 may be connected to storage device 110 for storing data from data sources 140, content source 130, or supplemental data source 120. For example, storage device 110 may include one or more digital video recorders (DVRs), hard disks, or any other storage mechanism. Control circuitry 114 may also be configured to execute the instructions of interactive media guidance application 106 from memory, which may include any type of storage or memory mechanism (e.g., RAM, ROM, hybrid types of memory, hard disks, and/or optical drives).

Although, in the illustrated embodiment of FIG. 1, interactive media guidance application 106 is internal to user equipment 102, interactive media guidance application 106 may be implemented externally or partially implemented externally to user equipment 102. For example, interactive media guidance application 106 may be implemented at supplemental data source 120 or content source 130 and may run using a client-server or distributed architecture where some of the application is implemented locally on user equipment 102 in the form of a client process and some of the application is implemented at a remote location in the form of a server process. Interactive media guidance application 106 may also be implemented on any suitable server, computer equipment, or set-top box accessible by user equipment 102. In some embodiments, interactive media guidance application 106 is integrated with another interactive application or is implemented as a standalone application, subprocess, or class (e.g., in an OCAP environment). In one embodiment, interactive media guidance application 106 is completely integrated within another interactive application running on user equipment 102. In this embodiment, the management and administrative functionality of interactive media guidance application 106 may be invoked directly by the other application or the underlying operating system after some user input from input device 108. In some embodiments, interactive media guidance application 106 includes a web-based interface for accessing interactive media guidance application 106 and performing all related functionality from a remote location (including planning media content viewing, updating viewing preferences, viewing and configuring coming-soon listing, and configuring various media planner settings).

In at least some embodiments, interactive media guidance application 106 is implemented in software. However, an implementation of software and/or hardware may be used in other embodiments. These arrangements are merely illustrative. Other suitable techniques for implementing interactive media guidance application 106 may be used if desired.

Interactive media guidance application 106 may use application data from data sources 140 to determine the type of content currently being displayed on display device 104 or recorded on storage device 110. For example, media guidance application data may include genre information (e.g., sports, mystery, or comedy), subgenre information, content summaries, actor/director information, ratings (e.g., parental control ratings, editorial ratings, and network popularity ratings), or any other suitable information about media content accessible within media system 100.

Interactive media guidance application 106 may store media planner schedules in memory (not shown) of control circuitry 114 or on storage device 110. The media planner schedules may include an identification of the content scheduled for viewing or recording as well as the priority of each scheduled content selection. As described in more detail below with regard to FIG. 15, the priority of the scheduled content may be used to determine the preemption order for recording and/or viewing content available during the same time period. For example, if control circuitry 114 includes only three tuners, such as tuners 115, than there may be a conflict if more than three assets are scheduled for recording or viewing at the same time (and a separate tuner is required to tune each asset). In this case, the media planner may inform the user of potential conflicts and allow the user to resolve any such conflicts in advance.

Figure 2:
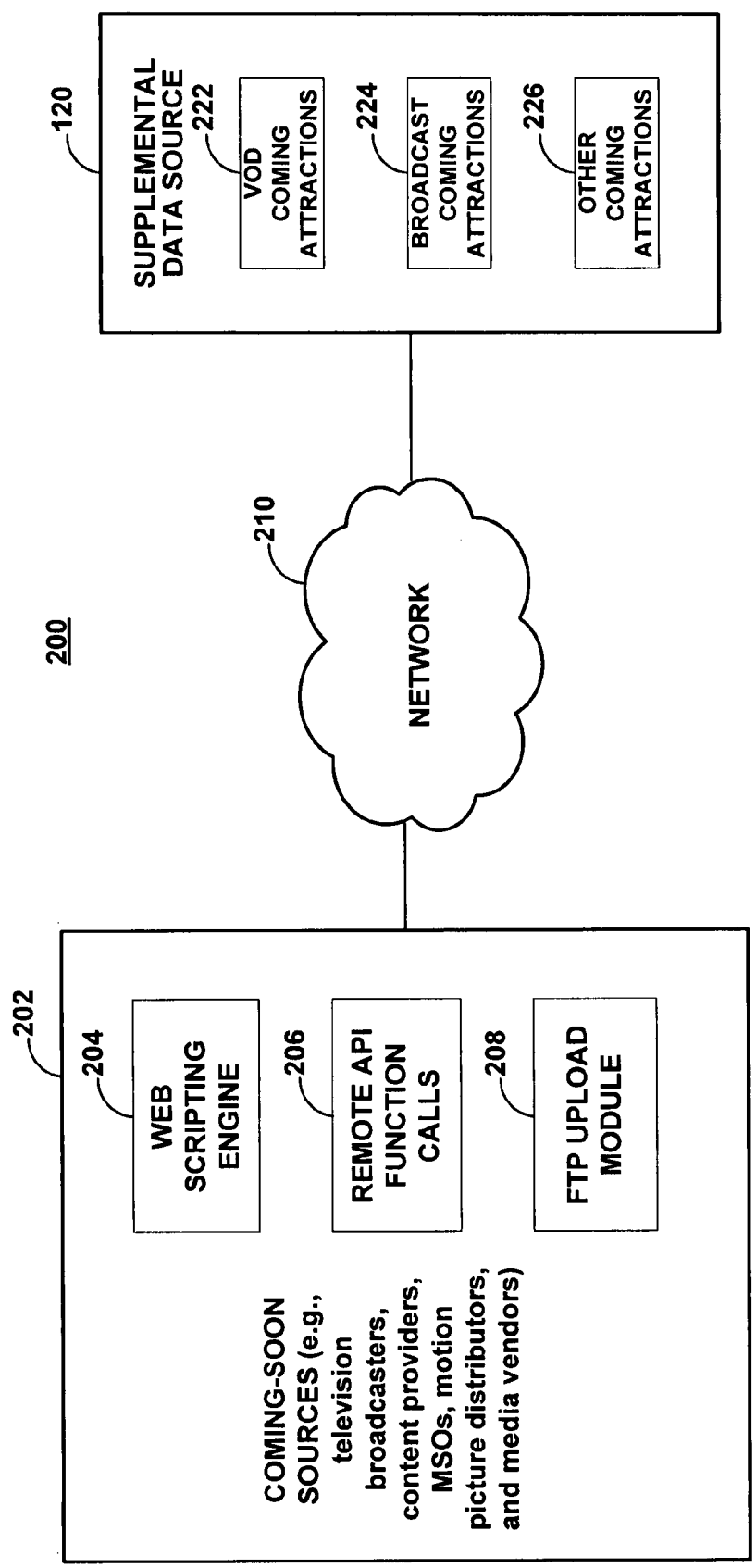
FIG. 2 is an illustrative block diagram of sources of coming-soon information in accordance with one embodiment of the invention.

FIG. 2 shows illustrative network 200 for supplying coming-soon announcements in accordance with one embodiment of the invention. Coming-soon sources 202 may include any content provider. Motion picture distributors, television broadcasters, MSOs, and media vendors may have advance knowledge of upcoming media content that may become available to user equipment device 102 (FIG. 1). For example, a network cable station may set approximate or incomplete programming schedules a season in advance, while accurate and complete schedule information is generally downloaded by the user equipment device only fourteen days in advance. So that the user may better plan his or her media content viewing, coming-soon sources 202 may send coming-soon announcements to supplemental data source 120 over network 210. Network 210 may include any one-way or two-way network, including a cable network, fiber-optic network, satellite network, cellular data network, or the Internet. Coming-soon announcements may be limited to announcements of programs that may be of particular interest to many viewers (such as the return of a popular series, the television premier of a popular movie, or the broadcast of a major sporting event). Announcements may also include programs that the provider particularly wishes to promote, such as the premier of a new series or a big-budget documentary or mini-series.

Coming-soon sources 202 may transmit coming-soon announcements over network 210 using one or more of web scripting engine 204, remote API function calls 206, and FTP upload module 208. For example, using web scripting engine 204, a coming-soon source may use a webpage interface to input announcement data relating to new coming-soon programming. Web scripting engine 204 may transmit announcements over network 210 (e.g., the Internet) and store the announcement in one or more of VOD coming attractions database 222, broadcast coming attractions database 224, and other coming attractions database 226. As indicated by the database names, each of databases 222, 224, and 226 may store coming-soon announcements relating to a different type of media content. For example, VOD coming attractions database 222 may store announcements relating to on-demand assets, and broadcast coming attractions database 224 may store announcements relating to linear (e.g., scheduled) assets. Alternatively, a single central or distributed database could be used to store all coming soon announcements. Other coming attractions database 226 may store announcements relating to Internet content and interactive applications and games that may be provided to user equipment 102 (FIG. 1).

Coming-soon sources 202 may also execute remote API function calls 206 in order to populate VOD coming attractions database 222, broadcast coming attractions database 224, and other coming attractions database 226. In some embodiments, remote API function calls 206 may include distributed API function calls, such as, for example, function calls implementing remote method invocation (RMI). The API function calls may be executed from a suitable web interface so that coming-soon sources 202 may conveniently populate VOD coming attractions database 222, broadcast coming attractions database 224, and other coming attractions database 226 with coming-soon data.

Finally, coming-soon sources 202 may upload coming-soon data over network 210 using file transfer protocol (FTP) upload module 208. Although FTP is used in some embodiments, any other suitable transfer protocol, such as secure FTP (SFTP), secure copy protocol (SCP), or secure shell (SSH), may be used in other embodiments. Using FTP upload module 208, coming-soon sources 202 may upload coming-soon announcements directly to supplemental data source 120. Announcements may be uploaded to different directories depending on the type of announcement. For example, on-demand announcements may be uploaded to a "VOD" directory, while broadcast announcements are uploaded to a "Broadcast" directory. An application process executing on supplemental data source 120 may automatically process announcement uploads and populate VOD coming attractions database 222, broadcast coming attractions database 224, and other coming attractions database 226 with the uploaded data. After the databases are populated, the announcement uploads may be deleted from supplemental data source 120.

In other embodiments, all coming-soon announcements are stored in a single announcement database. The announcement database may be indexed by any suitable field, including source, availability date, or genre. The announcement data stored in the database may include mandatory and optional fields. For example, the expected availability date (or date range) of the programming may be a mandatory field, while the rating (e.g., MPAA rating) may be an optional field.

Although coming-soon sources 202 may send coming-soon data to supplemental data source 120 in some embodiments, in other embodiments, coming-soon sources 202 are automatically searched for coming-soon data relating to new coming-soon content that may become available to user equipment 102 (FIG. 1). For example, interactive media guidance application 106 (FIG. 1) may periodically send requests to coming-soon sources 202 over network 210. A web service or process may execute on coming-soon sources 202 that automatically processes requests for new coming-soon data. After receiving an authenticated request, the web service or process may then deliver all available coming-soon data directly to user equipment 102 (FIG. 1).

Although some common schemes for transferring coming-soon data are described above, any other suitable transfer mechanism or mechanisms may be used to deliver coming-soon data to supplemental data source 120 in other embodiments. For example, announcements may be sent in serialized object form or a suitable mark-up language may be used. Announcements may also be delivered (e.g., using a multicast transmission protocol) directly to the user equipment devices instead of or in addition to being stored on supplemental data source 120. Supplemental data source 120 may use web crawling techniques to populate databases 222, 224, and 226. Alternatively, coming soon announcements may be entered manually into supplemental data source 120. Any suitable methods, including combinations of methods previously described, may be used to collect coming soon announcement data in other embodiments.

Figure 3:
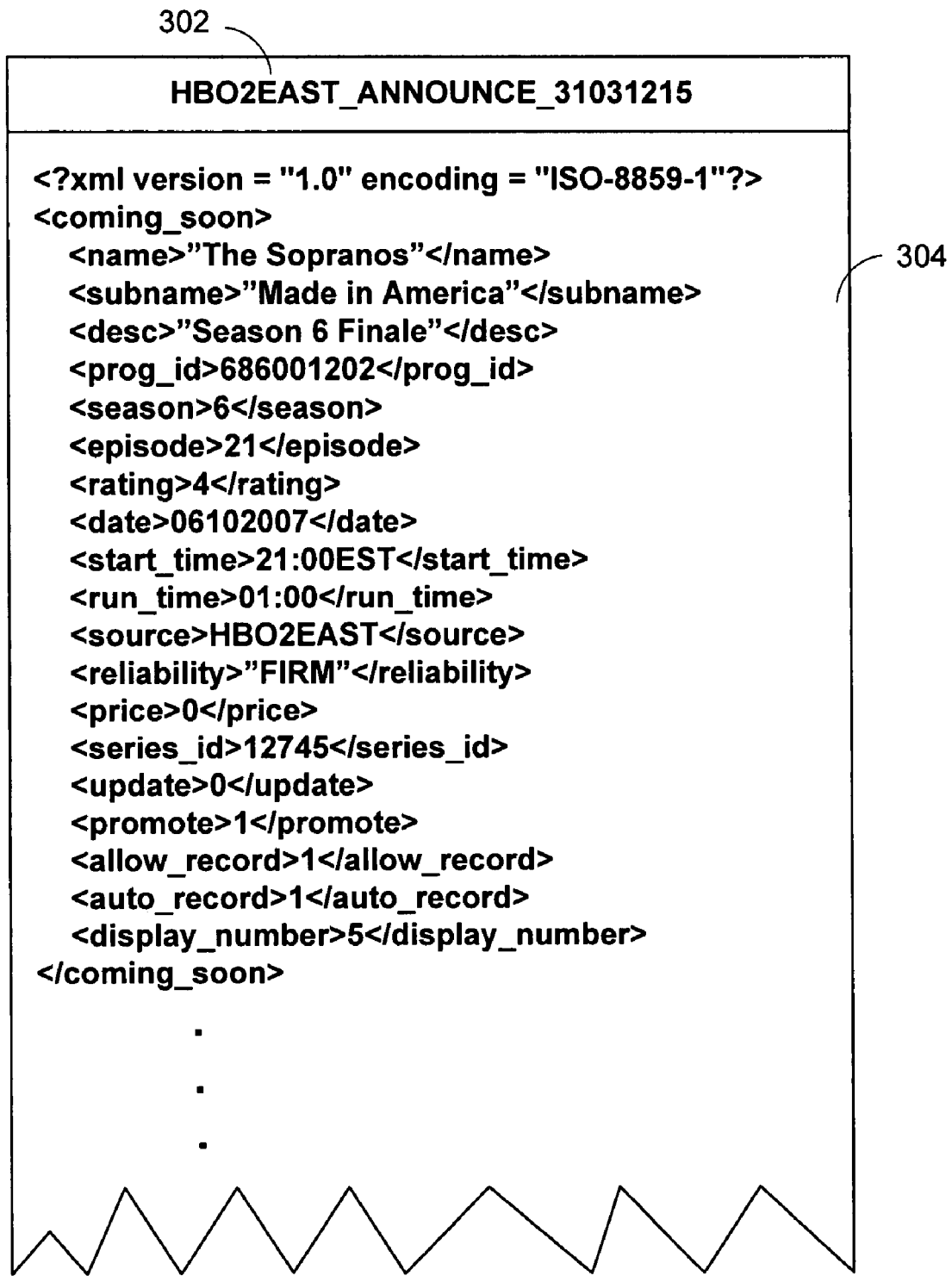
FIG. 3 is an illustrative coming-soon announcement data structure in accordance with one embodiment of the invention.

For example, as shown in FIG. 3, XML file 300 may store one or more coming-soon announcements. Although Extensible Markup Language (XML) is used in the example of XML file 300, any suitable mark-up language may be used, including, for example, any subset of Standard Generalized Markup Language (SGML). In addition, although the example of XML file 300 uses ISO/IEC 8859 encoding, any other suitable encoding (e.g., UTF-8, UTF-16, or UTF-32) may also be used. Any suitable program metadata format may be used, such as the CableLabs Video-On-Demand Metadata standard.

XML file 300 includes title 302, which may include a unique announcement identifier. Body 304 of XML file 300 may include a number of standard and optional tags that define the coming-soon announcement. A "name" tag may identify the name or title of the coming-soon content. A "subname" tag may identify the subtitle (or episode title) of the coming-soon content. A "desc" tag may include a text summary or description of the plot, an identification of the cast, director, and/or players (e.g., teams and/or athletes) in the coming-soon content. A program identifier tag may also be included in XML file 300 to uniquely identify the coming-soon content. The program identifier may be unique among all content available within media system 100 (FIG. 1). As such, the source of coming-soon data may be in communication with a program identifier database that uniquely allocates new program identifiers for coming-soon content. The program identifier database may be maintained by the cable operator, MSO, or a third-party. As described in more detail below, the unique program identifiers may be compared to corresponding program identifiers in downloaded program schedule data to determine when the coming-soon content is scheduled in the window of program schedule listings.

"Season" and "episode" tags may identify the season and episode numbers, respectively. A "rating" tag may identify an editorial rating (e.g., star rating), or content rating (e.g., MPAA or TV rating) associated with the coming-soon content. A "date" tag may identify the scheduled broadcast, availability, or release date of the coming-soon content. "Start_time" and "run_time" tags may identify the schedule start time or availability time and the scheduled duration of the coming-soon content, respectively. A "source" tag may identify the channel number, channel name, or source of the coming-soon content or the coming-soon announcement (e.g., MLB.com).

XML file 300 may also include a number of optional tags. Some of the more common optional tags are shown in the example of FIG. 3. For example, a "reliability" tag may identify how reliable or firm the information in the announcement (particularly the scheduled availability information) is given that the programming schedule may change as the scheduled availability date approaches. It is expected that announcements for coming-soon content scheduled to become available in the distant future (e.g., several months away) would have a lower reliability indicator than coming-soon content scheduled for more immediate availability (e.g., within the next few weeks). Depending on the type of content and the procedures unique to the content provider, however, the reliability tag may reflect any suitable reliability indicator. Schedule information for more distant content may also be expressed in less precise terms, such as to a season, a month, a week, or a day.

XML file 300 may also include a "price" tag. The price tag may identify the estimated access price for the coming-soon content. For example, on-demand content may be associated with an access charge or subscription fee. For content broadcast on channels in the local channel map that the user subscribes to, the price tag will generally indicate that the content is associated with a zero price (i.e., access to the coming-soon content is free). Some non-zero price may be included in the price tag to indicate that a surcharge is associated with the coming-soon content. A series identifier tag may identify a unique series identifier, if applicable. For example, as shown in FIG. 3, the coming-soon announcement is for the season finale of "The Sopranos." The season finale may be associated with a series identifier that uniquely identifies the series, "The Sopranos." The program identifier may uniquely identify the episode within the series or uniquely identify the episode among all other available media content.

The optional "update" tag may indicate whether the announcement is an update announcement or an original announcement. As previously described, announcements may be updated periodically as new information about the coming-soon content becomes available. Update announcements may take the same (or similar) form as original announcements except that the update announcement may only include tags that have changed from the original announcement. Thus, update announcements may be smaller in size than original announcements, thus saving network bandwidth.

XML file 300 may also include a "promote" tag and optional "promote_source" tag (not shown). These tags may signal to the interactive media guidance application whether this coming-soon content should be promoted or advertised on the user equipment device. For example, some content providers may pay an additional fee to have their content promoted within any of the display screens shown herein. The promote source tag may include a link to the promotional material itself (or the actual text of the promotion). The user equipment device may maintain a separate database of promotions and advertisements relating to coming-soon content. As described in more detail below in regard to FIG. 4, the advertisements and other promotional material in the advertisement database may be displayed simultaneously with the coming-soon listings or in any coming-soon display screen within an advertisement window. A user may select a coming-soon advertisement in order to schedule any suitable media guidance application function associated with the coming-soon content promoted in the advertisement.

Finally, XML file 300 may also include a number of advanced content control tags. These tags may specify what type of content access is granted to the user equipment device if and when the coming-soon content is made available to the user equipment device. These advanced content control tags may be saved to the user equipment device (e.g., in a coming-soon announcement database) and enforced at some later time when the coming-soon content is accessed by the user equipment device. Some of these tags may be used to control unauthorized copying, distribution, retransmission, or display of the coming-soon content. The interactive media guidance application may enforce all content control tags on the user equipment device. For example, an "allow_record" tag may indicate whether the content is permitted to be saved to the user equipment device (e.g., to a storage device 110 (FIG. 1)). In some embodiments, the allow recordings tag also prohibits caching and buffering of the coming-soon content. For example, the output of tuners tuned to coming-soon content where the allow record tag is not set may not be automatically buffered by the user equipment device. This may help prevent unauthorized recording or saving of restricted content to the user equipment device. The "display_number" tag may indicate the number of times the user is authorized to display the coming-soon content. For example, this tag may indicate the number of times the user may request the content via an on-demand service or the number of times playback is permitted from a recording device (e.g., storage device 110 (FIG. 1)). Other supported content control tags may include tags for limiting or prohibiting retransmission of the coming-soon content, editing of the coming-soon content, and/or sampling of the coming-soon content (e.g., for digital audio content). In some embodiments, the interactive media guidance application may interface with a digital rights management (DRM) application in order to request additional access permissions, as desired by the user.

Content control tags may also include tags for automatically performing some action after the coming-soon content is made available to the user equipment device. For example, an automatic recordings tag may indicate whether the content should be automatically recorded to a local storage device (e.g., storage device 110 (FIG. 1)) as soon as the content is available to the user equipment device. The automatic recordings tag may cause a recording to be automatically scheduled on the user equipment device. This date, time, and source of the scheduled recording may be updated automatically in response to receiving announcement updates. Other actions that may be automatically performed based on content control tags include automatically setting a reminder for the coming-soon content, bookmarking the coming-soon content, or adding the coming-soon content to a favorites list.

Although FIG. 3 shows one example of a typical coming-soon announcement, other formats or versions may be used with more or fewer tags defined. As already mentioned, in some embodiments, update announcements may only include the tags with changes from the original announcement (or most recent update announcement). As such, announcement updates may resemble abridged versions of full announcements, like the announcement shown in FIG. 3.

Figure 4:
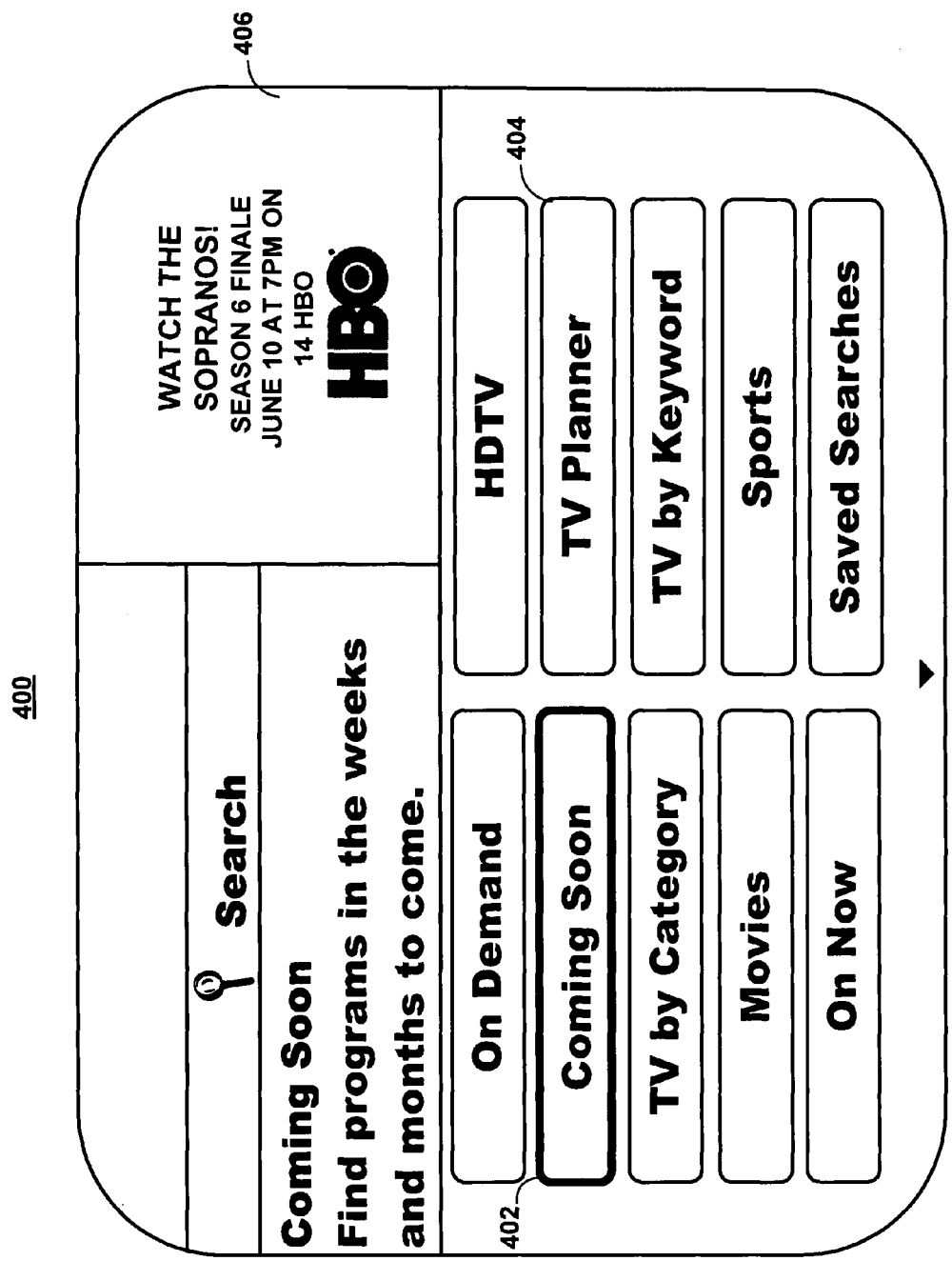
FIG. 4 is an illustrative search menu display screen in accordance with one embodiment of the invention.

As previously described, the interactive media guidance application may include a media planner feature for determining in advance which programs will be recorded or watched on the user equipment device. To determine in advance which programs to record or watch, the user may use listings data from the program schedule database, a program search utility, and series recordings. Coming-soon content may also be added to the media planner by clicking on an interactive element (e.g., an interactive advertisement or interactive listing) associated with (or promoting) the coming-soon content. As shown in FIG. 4, search menu display screen 400 includes a number of selectable options. After a user selects coming-soon option 402, display screen 500 (FIG. 5) may be automatically displayed. After a user selects planner option 404, media planner display screen 1200 (FIG. 12) may be automatically displayed.

Display screen 400 may also display interactive promotions or advertisements related to coming-soon attractions. For example, as shown in PIG window 406, an advertisement for the season finale of "The Sopranos" is displayed simultaneously with the search menu. This advertisement may be selected from a coming-soon advertisement database stored locally at the user equipment. The advertisement may include text, graphic, and video and may be identified in the coming-soon announcements. In some embodiments, the advertisement data is included in the original announcement itself. For example, the text "Watch the Sopranos! Season 6 Finale" may be included within the "promote_source" tag of the announcement. Placeholders for variable advertisement data may also be included. For example, the variable "% d" may be replaced with the scheduled availability or broadcast date, the variable "% t" may be replaced with the scheduled availability or broadcast time in the local time zone, and the variable "% s" may be replaced with the scheduled source (e.g., channel number or channel name). In this way, an advertisement template may be identified in the "promote_source" tag of the announcement, while modified advertisements are actually displayed to the user. The modified advertisements may be updated with new variable advertisement data after such data is received (e.g., through announcement updates). Thus, using the example above, the text advertisement "Watch the Sopranos! Season 6 Finale % d at % t on % s" may be modified at the user equipment to display the correct variable advertisement data for the local user equipment device. Channel numbers and channel names may be looked up from the local channel or source map. The resulting advertisement may then be displayed in PIG window 406.

PIG window 406 may display and/or repeat advertisements on any suitable schedule. In some embodiments, a new advertisement is displayed whenever the user selects a new option or button within display screen 400. In other embodiments, a new advertisement is displayed after a predetermined amount of time has passed. PIG window 406 may also display scaled video from, for example, the channel displayed immediately prior to requesting search menu display screen 400. A user may select PIG window 406 in order to schedule or execute any media guidance application function associated with the content identified by the advertisement currently displayed in PIG window 406.

Figure 5:
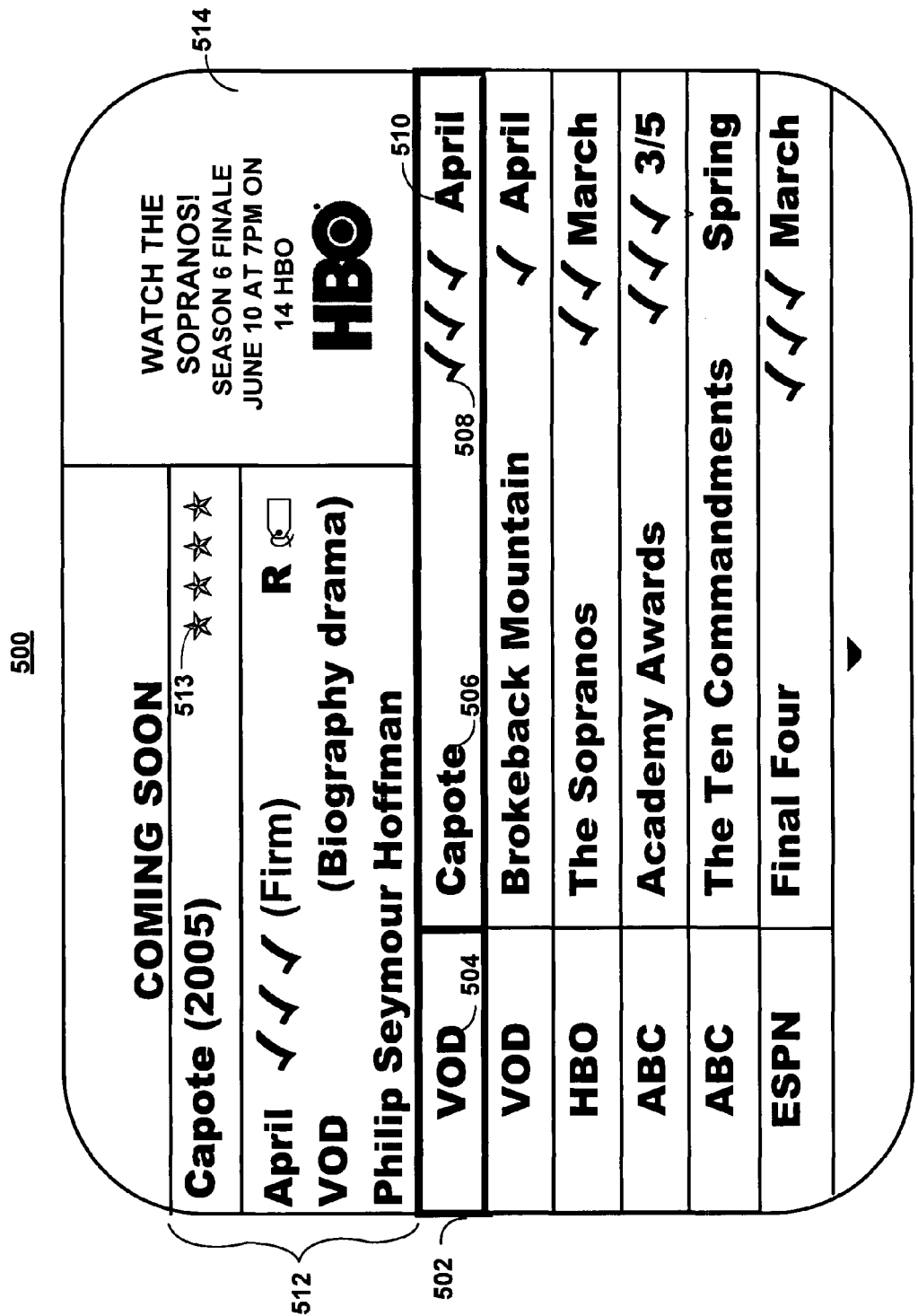
FIG. 5 is an illustrative coming-soon listing display screen in accordance with one embodiment of the invention.

FIG. 5 shows coming-soon display screen 500. The coming-soon feature allows the user to find programs that are not yet identified in the available window of program schedule data that is used to display program schedule listings on the user equipment device. Coming-soon display screen 500 may be accessed from search menu 400 (FIG. 4) by selecting coming-soon option 402 (FIG. 4). Coming-soon programs listed in coming-soon display screen 500 may include blockbuster movies that are planned in the next few weeks or months on VOD, PPV, premium or network channels, series returns and season premiers, upcoming mini-series and made-for-TV movies, award shows, concerts, sporting events, and other upcoming live events that are not yet in the schedule window. The programs may include packages, series, or other groups of programs (e.g., sporting event tournaments).

The user may select any content entry in coming-soon display screen 500, such as entry 502, and view more one or more pages of details (e.g., a description, network, and approximate availability time frame). The title of the program may be displayed in title area 506. The source of the program may be displayed in source area 504. The scheduled availability information (including availability time frame or date) of the program may be displayed in availability area 510. As the user moves a cursor up and down through the coming-soon program list, summary information may be displayed in summary area 512. For example, the title, rating (e.g., MPAA rating), user or editorial rating (e.g., star rating 513), genre, cast members, or any other suitable summary information may be displayed in summary area 512. Some or all of this information may be derived from the coming-soon announcement for the program.

In some embodiments, an indication of the reliability of the scheduled availability date (or availability time frame) is also displayed in coming-soon display screen 500. For example, reliability indicator 508 takes the form of zero to three check marks in the example of FIG. 5. Alternatively, a text indicator, such as "tentative" could replace the checkmarks in FIG. 5 for a low reliability coming-soon announcement. Any other suitable icon or indicator may be used in other embodiments. More check marks in reliability indicator 508 may indicate increased reliability. For example, three check marks in reliability indicator 508 may indicate that the availability information is firm and no longer subject to changes or updates. Zero check marks in reliability indicator 508 may indicate that the availability information is tentative and subject to frequent changes or updates. Reliability indicator 508 may be useful to a user in planning his or her viewing schedule.

Coming-soon display screen 500 may also include PIG window 514. PIG window 514 may display advertisements or previews for the content listed in coming-soon display screen 500. In some embodiments, PIG window 514 automatically displays a video preview (if available) of the content currently highlighted in the coming-soon list. For example, a video preview for the coming-soon movie "Capote" may be automatically displayed in response to a user selecting the listing for "Capote." In other embodiments, advertisements, previews, or promotions for any other content (regardless of whether it is represented in the currently displayed coming-soon listings) may be displayed in PIG window 514.

Figure 6:
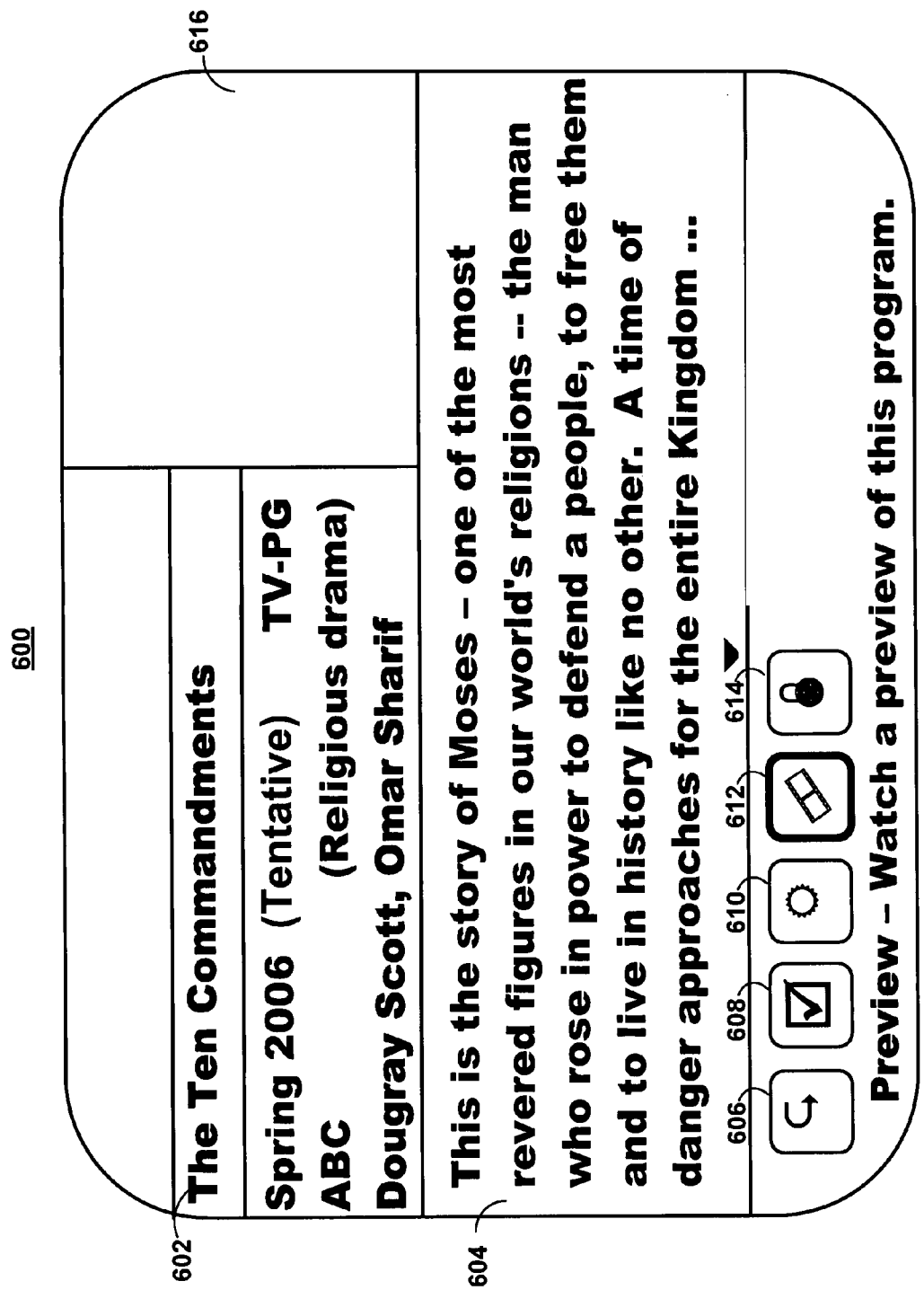
FIG. 6 is an illustrative coming-soon details display screen for a linear asset in accordance with one embodiment of the invention.

A user may select any entry in coming-soon display screen 500 to display a details page for the selected entry. For example, FIG. 6 shows details display screen 600 for a broadcast asset. The title of the asset may be displayed in title area 602. Summary information may be displayed in summary area 604. Some or all of this summary information may be derived from the data included in the description tag of the coming-soon announcement. PIG window 616 may show advertising or previews for the selected asset. For example, after the user selects preview button 612, a video preview may be displayed in PIG window 616. Previews may be available for many assets (including both VOD and broadcast assets). For broadcast programs, a user may also set a reminder by selecting reminder button 608. The user may schedule an advance recording by selecting recording button 610. To create or remove a parental control lock relating to the coming-soon content, the user may select parental control button 614. To return to coming-soon display screen 500 (FIG. 5), the user may select back button 606. If the user selects to schedule a recording or set a reminder, a listing for the coming-soon content may be displayed in the media planner at the anticipated availability date and/or time.

Figure 7:
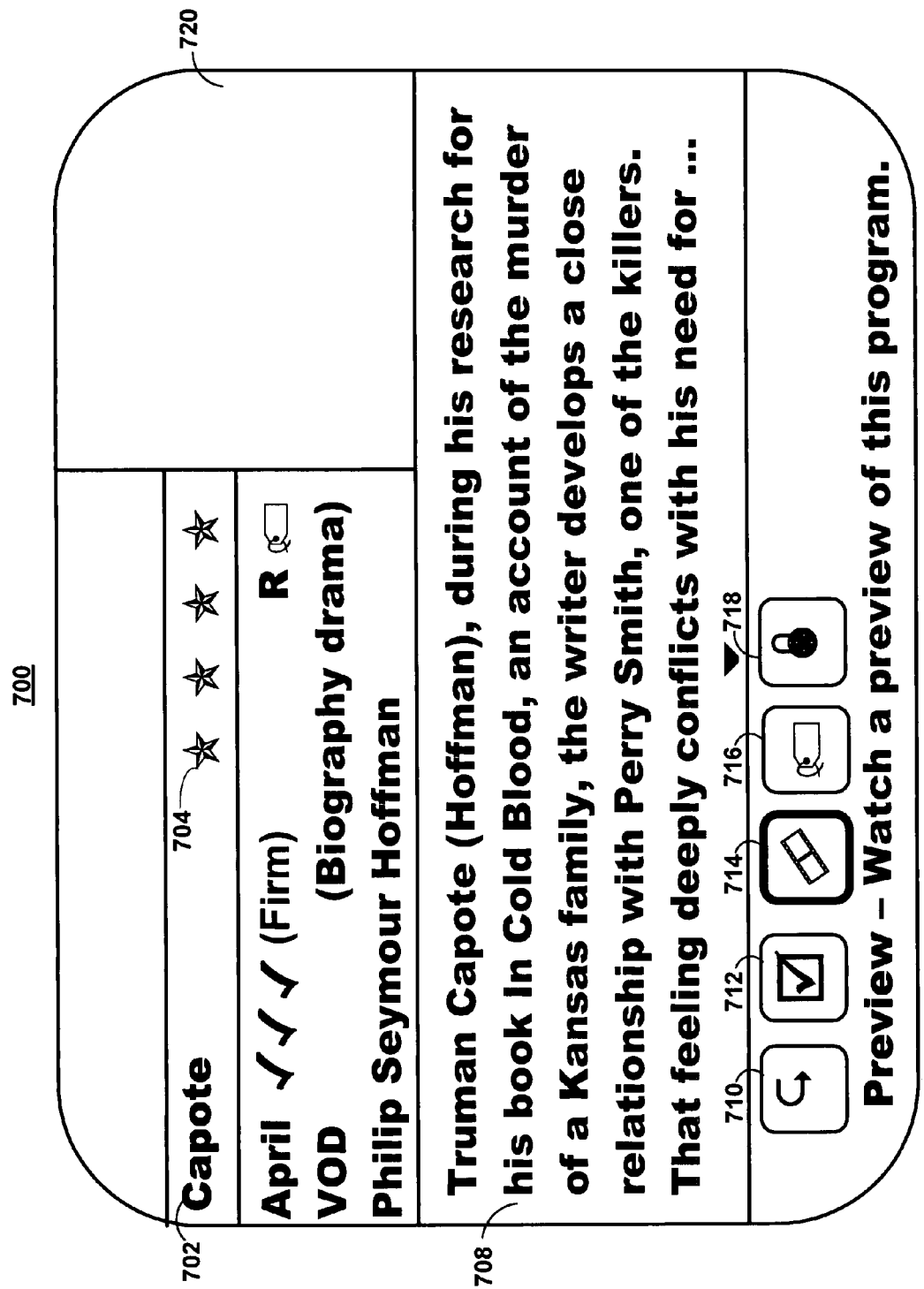
FIG. 7 is an illustrative coming-soon details display screen for a non-linear asset in accordance with one embodiment of the invention.

FIG. 7 shows details display screen 700 for an on-demand asset. Similar to details display screen 600 (FIG. 6) for a broadcast asset, details display screen 700 may display the title of the on-demand asset in title area 702 and summary information in summary area 708. In addition, user or editorial rating 704 may be displayed. This information may be derived from the rating tag in the coming-soon announcement for the on-demand asset. Additionally or alternatively, the rating may be retrieved from a supplemental data source (e.g., supplemental data source 120 of FIG. 1). This rating, which takes the form of a star rating in the example of FIG. 7, may indicate the popularity (or expected popularity) of the asset. It may also indicate the average rating given to the asset from all the major critics.

For on-demand assets, a user may create a new bookmark by selecting bookmark button 716. The user may also set a reminder to be displayed when the program is available by selecting reminder icon 712. A preview of the on-demand asset may be displayed in PIG window 720 after the user selects preview button 714. A parental control lock may be set or removed by selecting parental control button 718. To return to coming-soon display screen 500 (FIG. 5), the user may select back button 710.

In some embodiments, the user may also select various reminder and recording preferences when scheduling a recording or setting a reminder for a coming-soon attraction. For example, the user may select to record or be reminded of the on-demand or broadcast version of the asset, the pay or free version of the asset, the HD or SD version of the asset, or any other suitable recording or reminder preferences. In some embodiments, coming-soon attractions may also be added to normal content search results.

Figure 8:
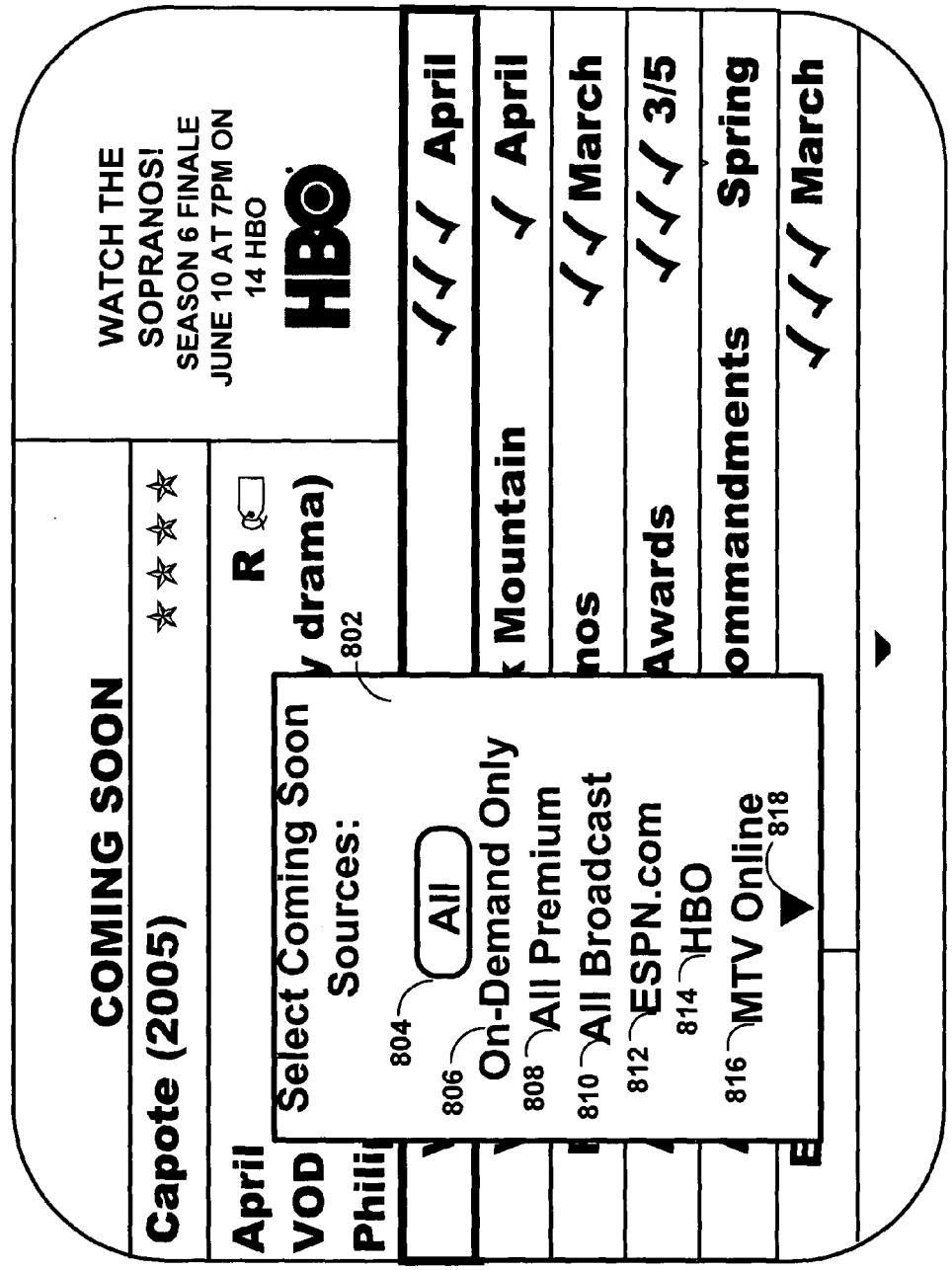
FIG. 8 shows an illustrative coming-soon source selection overlay in accordance with one embodiment of the invention.

The coming-soon list may include coming-soon attractions published by various sources (e.g., coming-soon sources 202 of FIG. 2). In order to filter the coming-soon listings, a user may select one or more of all the available coming-soon sources and display only the listings published by the selected source or sources. For example, FIG. 8 shows coming-soon display screen 800 with source selection overlay 802. A user may select one or more sources listed in source selection overlay 802 and then press an "OK" or other suitable button on an input device (e.g., input device 108 of FIG. 1) in order to display all the coming-soon listings published by the selected sources.

As shown in the example of FIG. 8, source selection overlay 802 includes all sources selection 804 to indicate that coming-soon display screen 800 should list content from all available sources. Other illustrative source selections may include on-demand only sources selection 806, all premium sources selection 808, all broadcast sources selection 810, ESPN.com source selection 812, HBO source selection 814, and "MTV Online" source selection 816. More available sources may be viewed by pressing a down cursor or arrow button on an input device (e.g., input device 108 of FIG. 1), as indicated by more icon 818.

After the user selects one or more sources from source selection overlay 802, coming-soon display screen 800 may display only the coming-soon listings associated with the selected sources. New sources may be added or removed at any time. For example, MLB.com may publish projected division playoffs games as well as Major League Baseball's World Series several weeks (or months) in advance of the series. As another example, ESPN.com may publish projected games and matches for various other sporting events and tournaments that will be available on the ESPN channel (or an affiliate channel or on-demand service). Premium channels (e.g., HBO) may publish their own projected content offerings well in advance of their actual release. These advance announcements may serve to increase viewership and community "buzz" about upcoming attractions. In addition, as described in more detail below, a user may add coming-soon listings to a comprehensive media planner so that the user may plan his or her viewing in advance.

In order to more easily navigate through the coming-soon listings, a user may also sort the listings by any suitable attribute. FIG. 9 shows coming-soon display screen 900 with sorting overlay 902. Sorting overlay 902 includes some common attributes that may be used to sort the listings, including by projected date 904, by genre 906, by title 908, by source 910, by reliability 912, and by rating 914. As indicated by more icon 916, other attributes may also be selected by pressing a down cursor or arrow button on an input device (e.g., input device 108 of FIG. 1). After the user selects a sort criteria, the listings in coming-soon display screen 900 may be reordered by the selected attribute. For example, the listing may be arranged alphabetically by title by selecting sort by title 908 or chronologically by date as a result of selecting sort by projected date 904.

As described above with regard to FIGS. 6 and 7, a user may schedule media guidance application functions for coming-soon content. For example, the user can select to record a coming-soon broadcast asset when it becomes available, bookmark a coming-soon on-demand asset once it gets loaded onto an on-demand server, or set a reminder for either type of asset. Other functions may also be performed. For example, the user may add the coming-soon asset to a favorite programs list or create a new parental control lock for the asset (e.g., lock by title).

Sometimes, however, a user will not have all the appropriate information in order to perform one of these media guidance application functions. In addition, sometimes a user may wish to condition the execution or scheduling of these functions on some attribute of the asset being true or some logical expression being satisfied. Since much of the information in the coming-soon announcement is not yet available or subject to change, conditional actions provide the user with added flexibility to condition the execution (or scheduling) of a media guidance application function on simple or compound logic.

Figure 10:
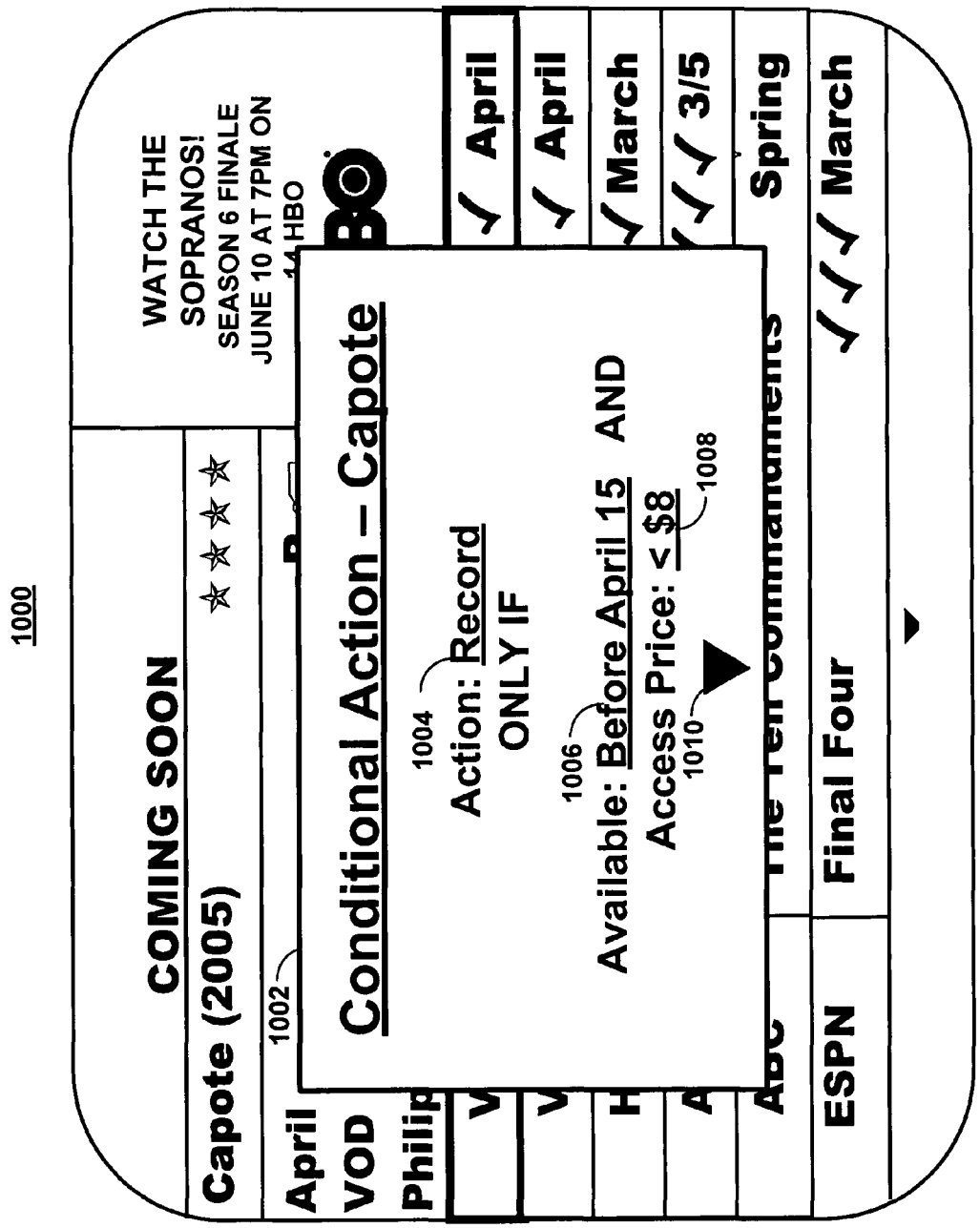
FIGS. 10 and 11 are illustrative conditional action display screens in accordance with one embodiment of the invention.

FIG. 10 shows such a conditional action request. Coming-soon display screen 1000 includes conditional action overlay 1002 for executing conditional media guidance application functions. The functions are called "conditional" because the actual execution (or scheduling) of these functions may be conditioned on some attribute of the coming-soon content at the time the content is made available to the user equipment device (e.g., at the time the content is actually broadcast or made available via an on-demand service or at the point when the listings data is as complete as the two week advance schedule listings data or sufficiently complete to complete the conditional action). As shown in the example of FIG. 10, conditional action overlay 1002 includes an indication of the action in action selection 1004. The user may select action selection 1004 in order to change the action to a different media guidance application function, if desired.

Under the action, one or more logic statements are listed. The logic statements may be combined to form compound logic expressions using such operators as "AND" and "OR." As shown in conditional action overlay 1002, the user wishes to record the coming-soon movie "Capote" only if the movie is available before April 15 and the access price associated with the movie is less than $8. Date selection 1006 and amount selection 1008 may be selected and changed by the user to any suitable values using an input device (e.g., input device 108 of FIG. 1).

To add additional logic statements to conditional action overlay 1002, the user may select more icon 1010. After selecting more icon 1010, a list of available content attributes may be displayed to the user. Content attributes may include any valid attribute of the coming-soon content, including cast members, directors, user ratings, MPAA ratings, TV ratings, whether the program is recordable, and access price. Some or all of these content attributes may be defined in the coming-soon announcement for the coming-soon content. The user may add another logic statement to conditional action overlay 1002 and complete the logic statement with a desired attribute value. After the coming-soon content is actually made available to the user equipment device (or at any suitable prior time), the interactive media guidance application may verify whether the conditional logic statements are satisfied by the actual attribute values. If so, the interactive media guidance application may take the specified action in action selection 1004. Otherwise, the action may be skipped. Suitable actions may include any media guidance application function. For example, the action may include one or more of scheduling the coming-soon content for recording, automatically recording the coming-soon content, setting a reminder for the coming-soon content, automatically tuning the coming-soon content, automatically displaying the coming-soon content, automatically ordering the coming-soon content, applying coming soon content to a user's profile or persistent "find content like this" search settings, and automatically submitting a user rating for the coming-soon content.

Figure 11:
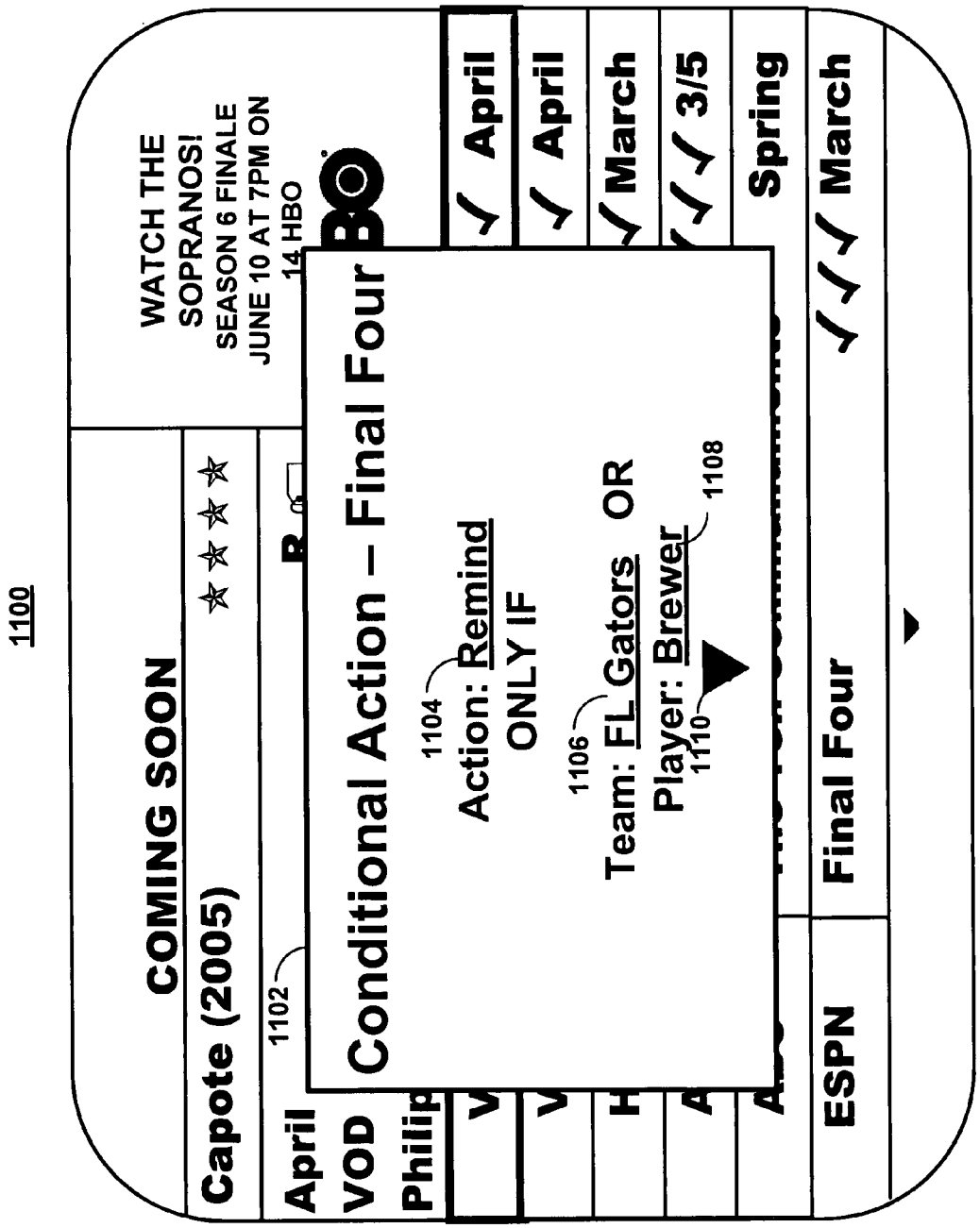

Conditional actions may be created for any coming-soon listing. FIG. 11 shows coming-soon display screen 1100 with conditional action overlay 1102 for a sporting event. Action selection 1104 in conditional action overlay 1102 indicates that the user wishes to be reminded of any game associated with the published "Final Four" program package so long as certain criteria are met. As shown in team selection 1106 and player selection 1108, the user will only be reminded if either the Florida Gators are playing in one of the games or the player Corey Brewer is playing. For example, if Corey Brewer is actually playing in a game associated with the Final Four package (even if he is not playing for the Florida Gators), then the user will be reminded of that game. The user may select more icon 1110 in order to add additional logic statements into the compound statement. For example, in addition to adding a player to the conditional statement, the user may also add one or more of the player's statistics. For example, the user may further refine the conditional statement so that the user is only reminded if player Corey Brewer has scored a certain number of points or obtained a certain number of rebounds this season.

As may be clear from the previous examples, in some embodiments, the specific logic terms available for inclusion in each logic statement may vary depending on the type of content and the genre of the content. For example, basketball sporting events may have different logic terms (and attributes) than baseball sporting events. Feature-length movies may also have different available logic terms (and attributes) than television shows. For example, movies may be associated with MPAA ratings while television shows may be associated with TV ratings. The user may select any suitable term or attribute for inclusion in a conditional logic statement. Conditional actions may be available from any suitable screen or feature within the interactive media guidance application, such as, for example, details display screen 600 of FIG. 6.

Figure 12:
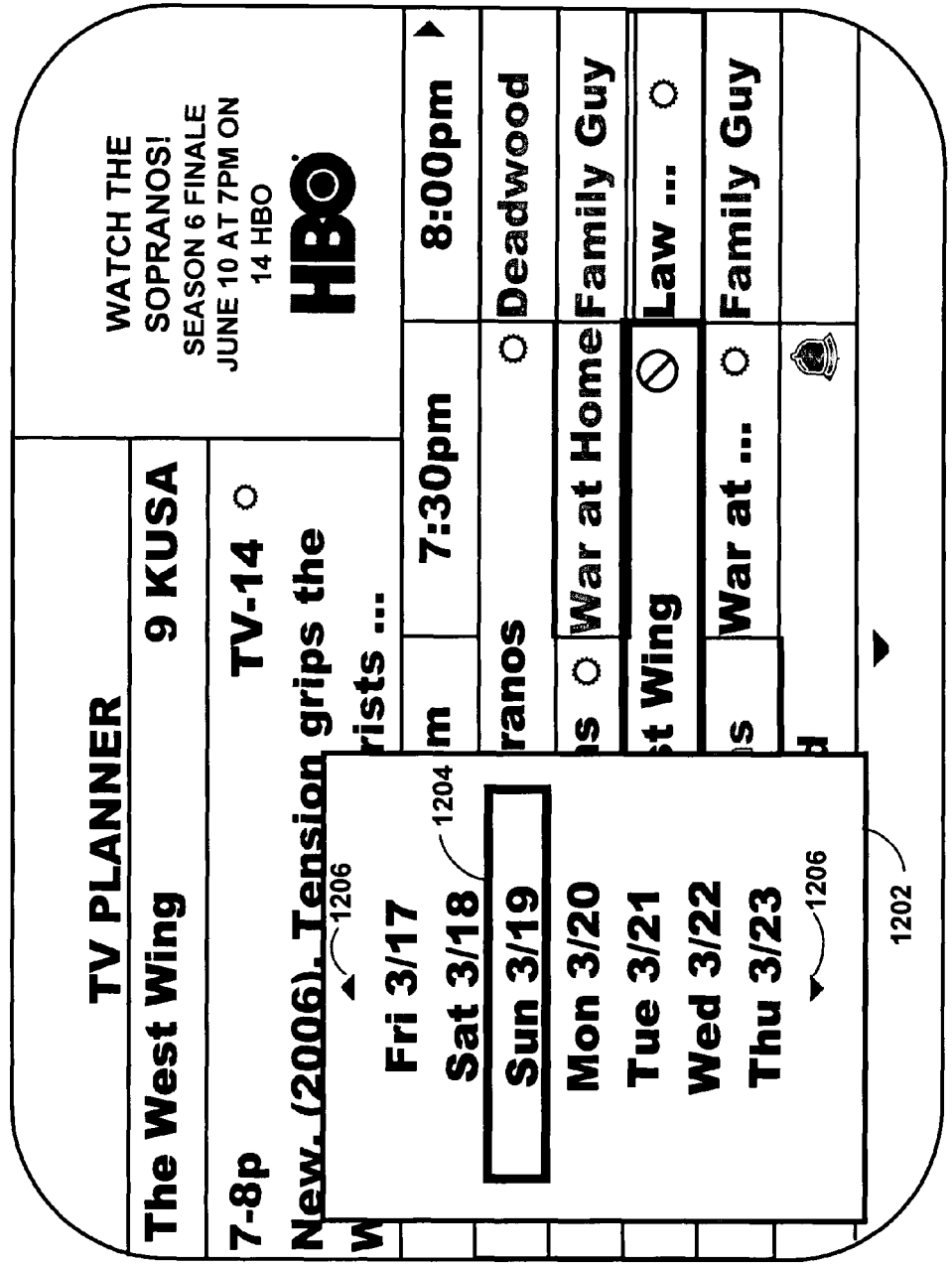
FIGS. 12 and 13 show illustrative planner window selection display screens in accordance with one embodiment of the invention.

The user may use a media planner feature to display a quick view of the planned viewing activities for a specific time period (e.g., next Tuesday during primetime). The user may select the day and time period, and may easily move to different days and times. For example, as shown in FIG. 12, media planner display screen 1200 includes date selection overlay 1202. The user may select any date from date selection overlay 1202, such as date selection 1204, in order to view the selected date window in the media planner. To view more dates in date selection overlay 1202, the user may select one or more arrows 1206.

Figure 13:
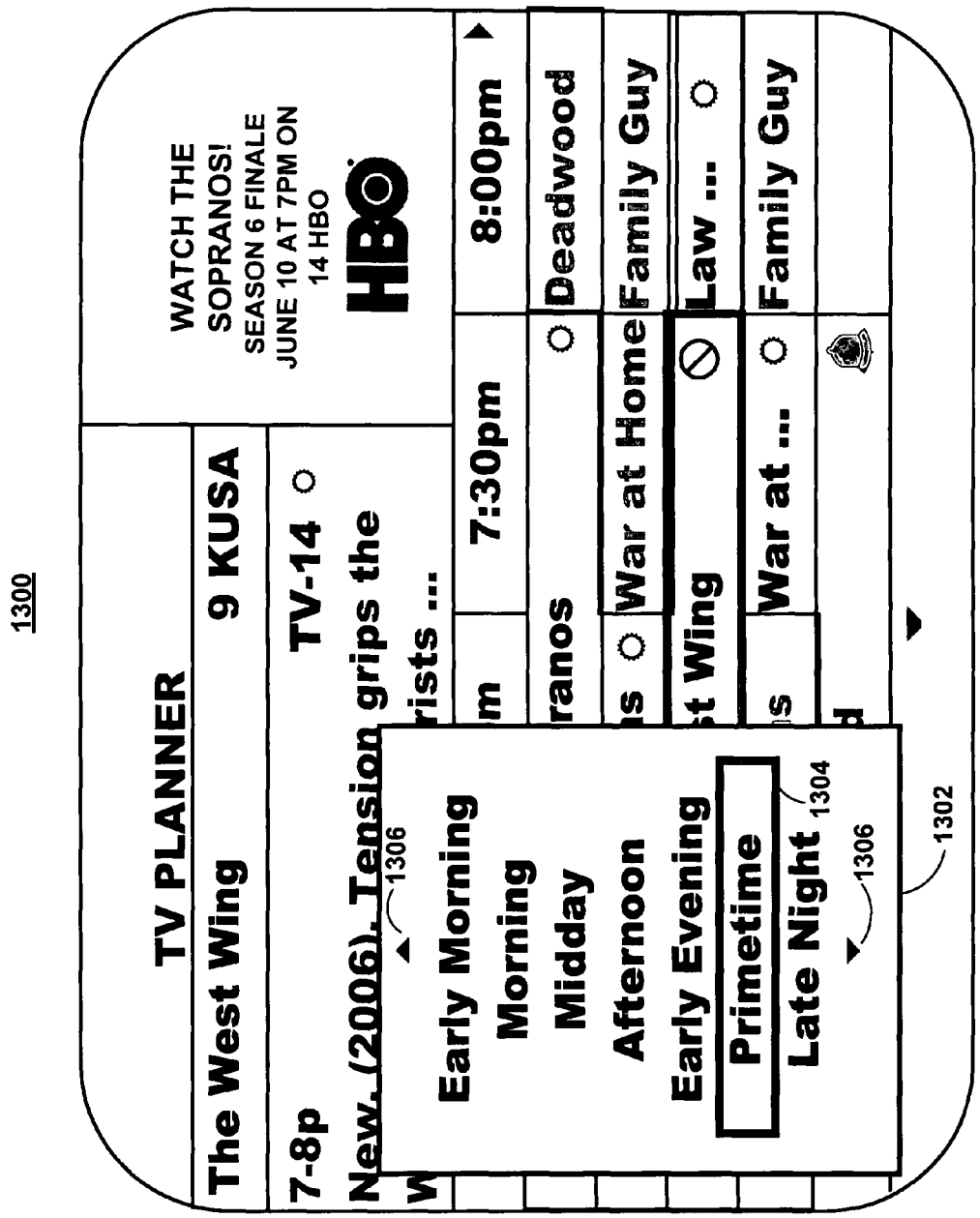

As shown in FIG. 13, after choosing a date the user may also access a time selection overlay, such as time window overlay 1302, from media planner display screen 1300. Similar to date selection overlay 1202 (FIG. 12), the user may select any time window from time window overlay 1302, such as and time selection 1304, in order to view the selected time window in the media planner.

Figure 14:
FIG. 14 shows an illustrative planner display screen in accordance with one embodiment of the invention.

FIG. 14 shows media planner display screen 1400 after the selection of a date and time. As shown in the example of FIG. 14, media content listings may be shown in media planner grid 1410. In some embodiments, programs to be recorded may be shown first (near the top of media planner grid 1410), programs with reminders second (below the programs to be recorded), and other selected programs third (below the programs with reminders). The current date and time window may be displayed at the top of media planner grid 1410. The user may use left and right arrow buttons on an input device (e.g., input device 108 of FIG. 1) in order to change the displayed time window. Thus, media planner display screen 1400 shows a window of time with all scheduled viewing activities (e.g., recordings and reminders).

The media planner may monitor the status of tuners available within the user equipment device, such as tuners 115 (FIG. 1). The media planner may mark those programs that are or are not of interest to the user. For example, as shown in FIG. 14, some programs are displayed in regular typeface (e.g., those with recordings and reminders set) and some programs are disabled or shown in grayed out typeface (e.g., those programs that the user has not expressed an interest in). For example, the show "Family Guy" is shown as disabled or in grayed out typeface in the illustrative planner grid shown in FIG. 14. This program may be broadcast during the displayed planner time window on a channel that is showing a program that the user has expressed an interest in (e.g., channel "13 KDVR"). However, the user may not have expressed an interest in the program "Family Guy" and hence it may be visually distinguished from programs in the planner grid that the user has expressed an interest in.

Media planner grid 1410 may include a plurality of identifiers (e.g., text labels, icons, graphics, listings, or cells) for tagged assets of interest during the media planner grid window. The identifiers may identify the assets by name or by any other suitable characteristics. For example, as shown in FIG. 14, identifier 1407 may include the name or title of the asset. Other suitable identifiers may include one or more of a program identifier, a series identifier, an episode name, an episode number, and a season number. Identifiers may also include a graphical icon, jacket art, or some visual representation of the asset. For example, a still frame or thumbnail video of the asset (or an advertisement for the asset) may be displayed within each listing in media planner grid 1410. This still frame or video may be an identifier of the asset. In other embodiments, the identifier may also include the entire listing or cell within media planner grid 1410, such as listing 1402.

Will not record icon 1404 may indicate that the program "The West Wing" will not be recorded because of its priority and the number of available tuners in the user equipment device. Will not record icon 1404 indicates to the user that a program of interest in the planner grid will not be recorded. The user may then have an opportunity to change (e.g., increase) the program's priority in order to actually record the program. Recording icon 1406 may indicate that the associated program may be scheduled for recording using an available tuner. This tuner may be reserved to perform the recording unless the priority of some other listing in media planner grid 1410 is increased above the priority for this recording. Reminder icon 1408 may indicate that a reminder is set for the associated program. Reminder icon 1408 may also indicate that the associated program is scheduled for automatic tuning and display at the scheduled time. A tuner may or may not be reserved for programs with reminders set. Thus, in some embodiments, the number of available tuners must be equal to (or exceed) the number of listings in the media planner marked for recording or viewing (and optionally listings for programs with a reminder set) for any specific time. The planner provides a convenient overview for the user of what is happening with respect to programs of interest in a given date/time frame. Listings may be displayed in priority order, giving the user a visual representation of why a requested program may not be available for viewing or recording at that time (or at some later time). For example, "Charmed" is shown at the highest priority because the user may have at some point (either from grid view or from planner view) indicated his or her preference to watch Charmed at that time and defer recording of The West Wing.

In some embodiments, recording conflict resolution management logic may inform a user in various views if the number of recordings scheduled exceeds the number of tuners available. As previously mentioned, in some embodiments, a reminder is considered a reservation of a tuner in the same way a recording is considered a reservation of a tuner. For example, FIG. 14 may represent a media planner grid for a triple-tuner user equipment device. In this embodiment, there may be no conflict at 7 PM because two tuners are used for recordings (the Sopranos and the Simpsons) and the third tuner may be reserved for the show that is intended to be watched at that time (i.e., "Charmed"). In this embodiment, a user is provided with an option to indicate a desired recording (e.g., The West Wing) using an "interested in possibly recording" option without having the system flag it as a violation or conflict of the tuner limitations of the user equipment device. The "interested in possibly recording" icon may look similar to will not record icon 1404. The user may select any listing within media planner grid 1410 in order to toggle the action icon between recording icon 1406, reminder icon 1408, and "interested but will not record" icon 1404. As previously mentioned, in the example of FIG. 14, three tuners may be available within the media system. As a result, at most three listings in media planner grid 1410 may be scheduled for recording, viewing, or both recording and viewing at any given time without a conflict.

As shown in FIG. 14, reminder icon 1408 indicates that a reminder is set for the television show "Charmed" available on channel "2 KGWN" at 7 PM on Sunday, March 19. This program may be automatically tuned and displayed by the interactive media guidance application at 7 PM using one available tuner. Also at 7 PM, "The Sopranos" and "Simpsons" may both be automatically recorded using available tuners. Since "The Sopranos" is displayed higher in media planner grid 1410 than "Simpsons", this listing may have higher priority. Thus, if any recordings need to be preempted for any reason, the recording of "Simpsons" may be preempted before the recording of "The Sopranos." The user may drag any listing in media planner grid up or down in media planner grid 1410 to change the listing's priority. For example, the user may press a "PAGE UP" or "PAGE DOWN" key on an input device (e.g., input device 108) while any listing is highlighted with the cursor in order to increase or decrease that listing's priority. The user may also select and drag listings (e.g., with a mouse or other suitable input device) within media planner grid 1410. When a program is moved up or down in the grid, its icon may be automatically changed between record/will not record or remind/will not remind. In this way, listings may be easily moved up and down in priority, and the user may also switch or toggle a displayed indicator between a reminder, a recording, an automatic tuning, and deletion of the listing from the planning grid.

The user may also move or drag listings in media planner grid 1410 left or right to change the start time of the scheduled activity. For example, if there is a tuner conflict at 7 PM because of too many assets being recorded simultaneously, then the user may drag one of these assets left or right within media planner grid 1410 to adjust the time of the scheduled recording. Some assets may be only dragged left (i.e., moved earlier in the schedule), only dragged right (i.e., pushed later in the schedule), or dragged left and right. For example, a linear asset (e.g., broadcast television programming) is generally not available before its broadcast time, so the user may only be permitted to drag this programming to the right in media planner grid 1410. If a linear asset is moved or dragged to a later time than its broadcast time (i.e., moved right in media planner grid 1410), then in some embodiments, the asset may be automatically recorded to the user equipment device (e.g., on storage device 110 of FIG. 1) so that the asset may be displayed time-shifted at the new scheduled time. A user may be prevented from moving a program to the right if there is no tuner available to record it. In some embodiments, a copy of a linear program may be stored on a server such as content source 130 (FIG. 1). This remotely stored copy may then be made available for time shifted viewing. In some embodiments, programs that are available with start over functionality may be indicated to the user in the planner window and used to help resolve tuner conflicts. For example, a variant of start over which allows programs to be watched one or two hours after their airing time would be recognized by the planner and allow time shifted viewing of those programs to the right in the grid.

In the example of FIG. 14, if the user presses the "PAGE UP" key on an input device (e.g., input device 108 of FIG. 1), the priority of the currently highlighted listing, "The West Wing," would be raised above that of "Simpsons," and it would be recorded (preempting the recordings of "Simpsons" and "War at Home"). The listing for the "The West Wing" may then be automatically displayed in a higher position in media planner grid 1410 (i.e., above "Simpson"). Pressing an "INFO" key may allow the user to access all record/remind options for the program. Selecting the day cell on the grid and pressing "OK" may redisplay date selection overlay 1202 (FIG. 12), allowing the user to quickly select a new day and time to view. In some embodiments, content may be added to the planner view from the grid view by simply tagging the content of interest (e.g., setting an "interested" flag for the program, a reminder, or a recording for the program, or setting a bookmark for the program). In some embodiments, other content (e.g., coming soon data) may be accessible directly from the planner view (e.g., via a submenu display for a search function, for example).

Since media planner grid 1410 shows the user's planned viewing activities for some narrow time window (e.g., 7 PM to 8:30 PM), some rows in the media planner grid 1410 may correspond to the same source or channel. As shown in the example of FIG. 14, channel "13 KDVR" appears twice in media planner grid 1410 because the user has a planned recording at 7 PM and another planned recording at 7:30 PM, but the two recordings are at different priority levels. In some embodiments, only single row is used in media planner grid 1410 to denote multiple planned activities on the same channel or source.

The viewer may scroll down from media planner grid 1410 to display the entire program grid, allowing the viewer to select additional programs for viewing at that time. In some embodiments, favorite channels may be displayed near the top of media planner grid 1410 (for example, just below the rows for programs with recordings or reminders) or may be otherwise quickly selectable, allowing the viewer to easily find programs on those channels during the selected time window. Other programs may be automatically moved near the top or otherwise visually distinguished in media planner grid 1410 based on user preferences or viewing history. For example, listings matching user viewing preferences, perhaps specific to that day of the week and time period, may be displayed in a different font or color from other listings in the planner view, even though these programs were not explicitly identified as of interest by the user. Programs within the selected time window that are being promoted may also be highlighted or otherwise visually distinguished in media planner grid 1410. The media planner may also include a "windowed search" feature. This feature may allow the viewer to search for programs based on any supported criteria, constrained to broadcast within the selected time window.

The media planner may also include one or more special rows used to add on-demand and locally recorded content to the planner. FIG. 15 shows media planner display screen 1500 with on-demand planner row 1502. On-demand planner row 1502 may be used to add on-demand content to the media planner. A user may select on-demand planner row 1502 to display a listing or menu of on-demand content available within the selected time window. The user may select any on-demand content selection to add it to on-demand planner row 1502. As shown in FIG. 15, an episode of the hit series "Entourage" is planned for viewing at 7 PM. Since this asset is now planned for viewing on an available tuner, the listing for "Charmed" is displayed with a "do not remind" icon. The do not remind icon is analogous to the do not record icon in that it may indicate an interest in a program (which in some embodiments keeps it in the planner view) and a related function (e.g., remind or record) but does not specifically reserve a tuner for the operation. Likewise, the do not remind icon may be placed on the program automatically in some embodiments as the priority of the programs is changed (e.g., via moving them up and down in the planner view) indicating that this program may no longer be viewed or recorded due to the lack of an available tuner (assuming that the user equipment device has only three available tuners). In some embodiments, on-demand planner row 1502 is always displayed at the top of the media planner grid. Since on-demand programs are typically not recorded locally to the user equipment device, on-demand planner row 1502 may not be associated with a priority. In other embodiments, on-demand planner row 1502 may be moved up and down through the media planner grid like any other row in the planner because the viewing of the VOD content may require a tuner. Thus, if the VOD content is flagged for viewing during a specific time period, it may count as a reservation of a tuner, similar to other programs scheduled for recording or viewing.

Figure 16:
FIG. 16 shows an illustrative planner display screen with a recordings row in accordance with one embodiment of the invention.

FIG. 16 shows media planner display screen 1600 with DVR planner row 1602. DVR planner row 1602 may be used to add locally recorded assets to the media planner grid. A user may select DVR planner row 1602 to display a listing or menu of locally recorded content (e.g., content recorded to a DVR hard drive). The user may select any content selection in the listing or menu to add it to DVR planner row 1602. Similar to on-demand planner row 1502 (FIG. 15), DVR planner row 1602 may be special in that it may always be displayed at the top of the media planner grid. In some embodiments, DVR planner row 1602 is not associated with a priority because, in some embodiments, playback of a DVR asset does not require a tuner. In other embodiments, DVR planner row 1602 may be moved up and down through the media planner grid like any other row in the planner. In some embodiments, a single row may be used for both on-demand and locally recorded content. Both locally-recorded and on-demand content may be moved left and right in the planner grid, similarly to linear content, but without the corresponding constraints.

As previously mentioned, the interactive media guidance application may provide promotional opportunities using the coming-soon and media planner features. Advertisements may be targeted based on user preferences, viewing history, and planned viewing activities in the media planner. For example, as shown in media planner display screens 1500 (FIG. 15) and 1600 (FIG. 16), advertisements may be displayed simultaneously within the media planner grid. The advertisements may promote one or more listings currently displayed in the media planner. Alternatively, the advertisements may promote other programming offered by a content provider whose programming is displayed in the media planner grid. For example, if an episode of "The Sopranos" has been added to the media planner grid, advertisements for The Sopranos, HBO, or any other programming offered by HBO may be displayed (e.g., in PIG windows 406 (FIG. 4), 514 (FIG. 5), or any other suitable PIG or advertisement window shown herein). Additionally or alternatively, advertisements for unrelated products and services may be displayed.

In some embodiments, a "week-at-a-glance" feature allows viewing of a weekly planning view with some smart modes (e.g., collapsing of days where the user does not watch TV—for example—Tuesday bowling nights, viewing of only the evening portion of the displayed days, and viewing a subset of the week—for example Monday through Wednesday—for better visibility). This week-at-a-glance feature allows the user to move assets around with automatic creation and deletion of recording events as appropriate to the modified viewing plan.

Some assets, such as locally recorded assets, on-demand assets, and even broadcast asset, may be viewed and/or recorded without commercials even though the original asset was transmitted or broadcast with commercials. Typically, several commercial interruptions may be inserted into broadcast television programs. Each of these commercial interruptions may include one or more commercials, typically ranging in duration from 15 seconds to one minute in length. In some embodiments, commercial status flags are transmitted to the user equipment device in the vertical blanking interval (VBI) or out-of-band on a separate status stream. These commercial status flags may mark the start and end of the commercial interruptions within an asset. These commercial status flags may also be used to record an asset to a local storage device (e.g., storage device 110 of FIG. 1) without commercials.

In some embodiments, assets may be recorded with commercials, but played back without commercials. The commercial status flags may be written or saved to the local storage device (e.g., storage device 110 of FIG. 1) with the recorded asset. For example, the commercial status flags may include an indication of the start and stop times of the commercial interruptions within the asset. After receiving a request to play back or view the asset, the asset may be automatically played back or viewed without the commercials. Although in some embodiments, commercial status flags may be read to determine the location of the commercial interruptions, in other embodiments an analysis of the black frame interval and/or other audio/video characteristics is additionally or alternatively used. This analysis may be performed either while the program is being recorded or after it has been recorded.

Figure 17:
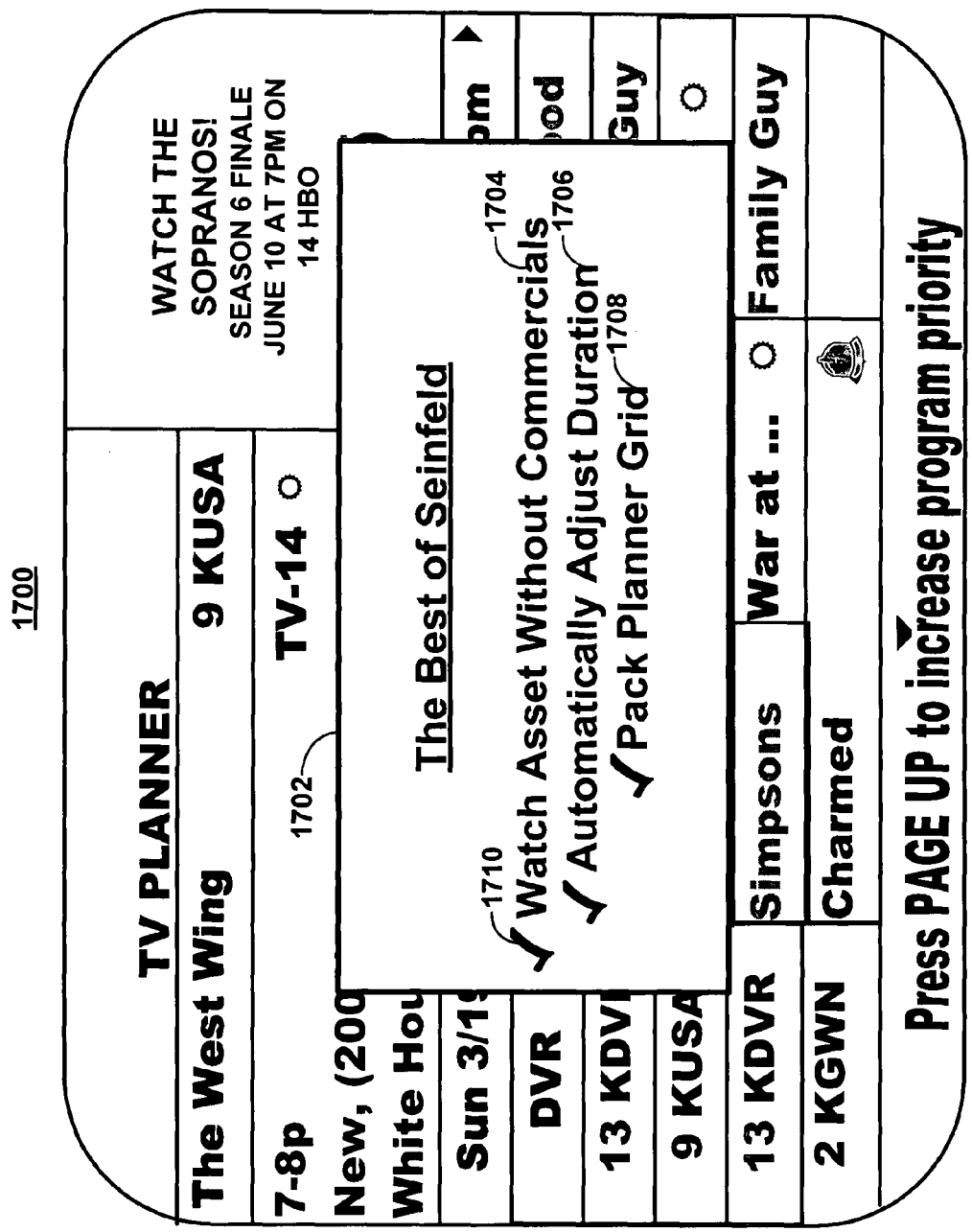
FIG. 17 shows an illustrative watch without commercials display screen in accordance with one embodiment of the invention.

Since watching an asset without commercials may affect the asset's play back time (i.e., the asset's duration or runtime), the media planner grid may automatically adjust the user's visual plan (e.g., as shown in media planner grid 1410 of FIG. 14) by the appropriate amount so that other programs may be scheduled in the media planner. For example, FIG. 17 shows media planner display screen 1700 with commercial adjustment overlay 1702. In some embodiments, when a user adds an asset that is eligible for commercial skipping to the media planner grid, commercial adjustment overlay 1702 is automatically displayed. Commercial adjustment overlay 1702 may notify the user that the asset is available to be viewed without commercial interruption. Several other options may also be displayed to the user. As shown in the example of FIG. 17, commercial adjustment overlay 1702 includes watch without commercials option 1704, adjust duration option 1706, and pack planner grid option 1708. A user may toggle check mark indicator 1710 on and off to select one or more of the options.

If watch without commercials option 1704 is selected, the asset may be played back without commercial interruptions. For example, if an asset is recorded locally to a storage device with commercials and the asset's commercial status flags were also recorded or saved to the storage device, the asset may be automatically viewed without commercials when the asset is played back. If the user sets watch without commercials option 1704 in the media planner grid, this option may be saved and associated with the selected asset so that the user will not be required to manually skip commercials when the asset is automatically displayed pursuant to the user's planned schedule. If adjust duration option 1706 is selected, the asset's runtime will be automatically adjusted to take into account the removed commercials. This reduced runtime may then be visually indicated in the media planner grid.

If pack planner grid option 1708 is selected, other listings in the planner grid may be packed to utilize the time freed by the runtime adjustment. For example, if 10 minutes are saved in the planner grid by viewing the asset without commercial interruption, then other assets may be viewed or recorded during this time. This allows for more efficient use of the user's planned viewing schedule.

FIG. 18 shows packed media planner display screen 1800. As shown in FIG. 18, listing 1802 for "The Best of Seinfeld" has been truncated to reflect its new runtime (without commercials). For example, the show may have originally been broadcast as a one-hour special, but now is capable of being presented without commercial interruption in 40 minutes. The interactive media guidance application may determine the new runtime by subtracting the length of all commercial interruptions within the asset (as determined by the commercial status flags) from the original runtime of the asset. Listing 1802 may then be automatically adjusted to indicate its new runtime. Listing 1804 for another locally recorded asset has also been adjusted to start immediately after the conclusion of the Seinfeld episode in listing 1802. In this way, the user's planned viewing scheduled is efficiently packed to save time. If the user had not selected pack planner grid option 1708 (FIG. 17), listing 1804 may have been adjusted, but listing 1804 may have remained scheduled to start at 8:00 PM. The user could then add additional content during the time saved by watching the asset without commercials, if desired, or use the time to perform other non-television-related tasks.

The user may make other adjustments to items in the media planner grid. For example, the user may select either the start or end edge of the program and drag it to the left or right, lengthening or shortening its duration. In some embodiments, the user may highlight an item in the grid, select it using a select key on user input device 108 (FIG. 1), select the left or right edge of the program listing using the left or right arrow key and select key on user input device 108 (FIG. 1), and then move the edge of the item in the grid by using a key such as a next/previous page key. Moving the right edge of a program listing to the right for a planned recording of a linear program may cause the recording time to be extended, and moving it to the left may cause the recording to be truncated.

Similarly, moving the left edge of a program listing for a planned recording of a linear program to the left may cause its recording to be started early, while moving it to the right may cause its recording to be delayed. In some embodiments, shortening the listing for an on-demand or recorded program may truncate its start or end. In other embodiments, it may actually compress or extend its playback time. In yet other embodiments, it may change the amount of time allocated for watching the program, but not change the playback of the program itself. For example, the user may allocate 90 minutes to watch a 60 minute program because of planned interruptions, during which the user may, for example, intend to pause the program.

In some embodiments, the user may be allowed to split the planned viewing of a program (e.g., linear, recorded, or on-demand program) into two or more pieces or segments. For example, the user may be allowed to put a program into a viewing time smaller than the duration of a program (or plan the viewing of other programs such that there is insufficient time to view the program in its entirety). The user may then be allowed to select a "split" function. After receiving the split instruction, the interactive media guidance application may put as much of the program into the viewing slot as will fit, and then allow the user to drag the remainder of the program into another viewing slot or segment. In this way, a user may plan out the viewing of, for example, a long documentary over the course of two evenings. Depending on the type of asset (e.g., VOD or linear broadcast asset), the second half or split may be automatically scheduled for recording while the first half is not scheduled for recording.

In some embodiments, the interactive media guidance application may anticipate and automatically record content that a user would likely be interested in watching. The determination of what content the user would likely be interested in watching may be based on one or more of the user's profile, the user's viewing preferences, and content included in the user's media planner grid. The interactive media guidance application may also associate various recording and "keep" priorities with the content selected for automatic recording. A keep priority may determine the preference or order assets on a storage device are overwritten in order to make room for new assets. For example, assets matching a large number of user viewing preferences may be assigned a higher keep priority than assets matching fewer user viewing preferences.

In some embodiments, the interactive media guidance application integrates or interfaces to a user's external calendar (e.g., Microsoft Outlook calendar) and notes when the user will be away. The interactive media guidance application may then record programs that the user would likely be interested in watching, as indicated by the user's past behavior (e.g., the user may have set a reminder for a particular program or accessed episodes of the same series on a predetermined number of prior occasions), during the period that the user is noted as away.

In addition to determining when the user is away from his television or out of town using data obtained from interfacing with an external calendar application, in some embodiments the interactive media guidance application may use activity monitoring to detect the user's presence or absence. For example, the interactive media guidance application may detect that a user regularly watches "CSI Miami" almost every Friday at 8 PM. One Friday, if the interactive media guidance application notes that there has been no user activity for a predetermined amount of time (e.g., no channel change requests, volume change requests, or any user input on input device 108 of FIG. 1), the interactive media guidance application may automatically record the content on behalf of the user.

Figure 19:
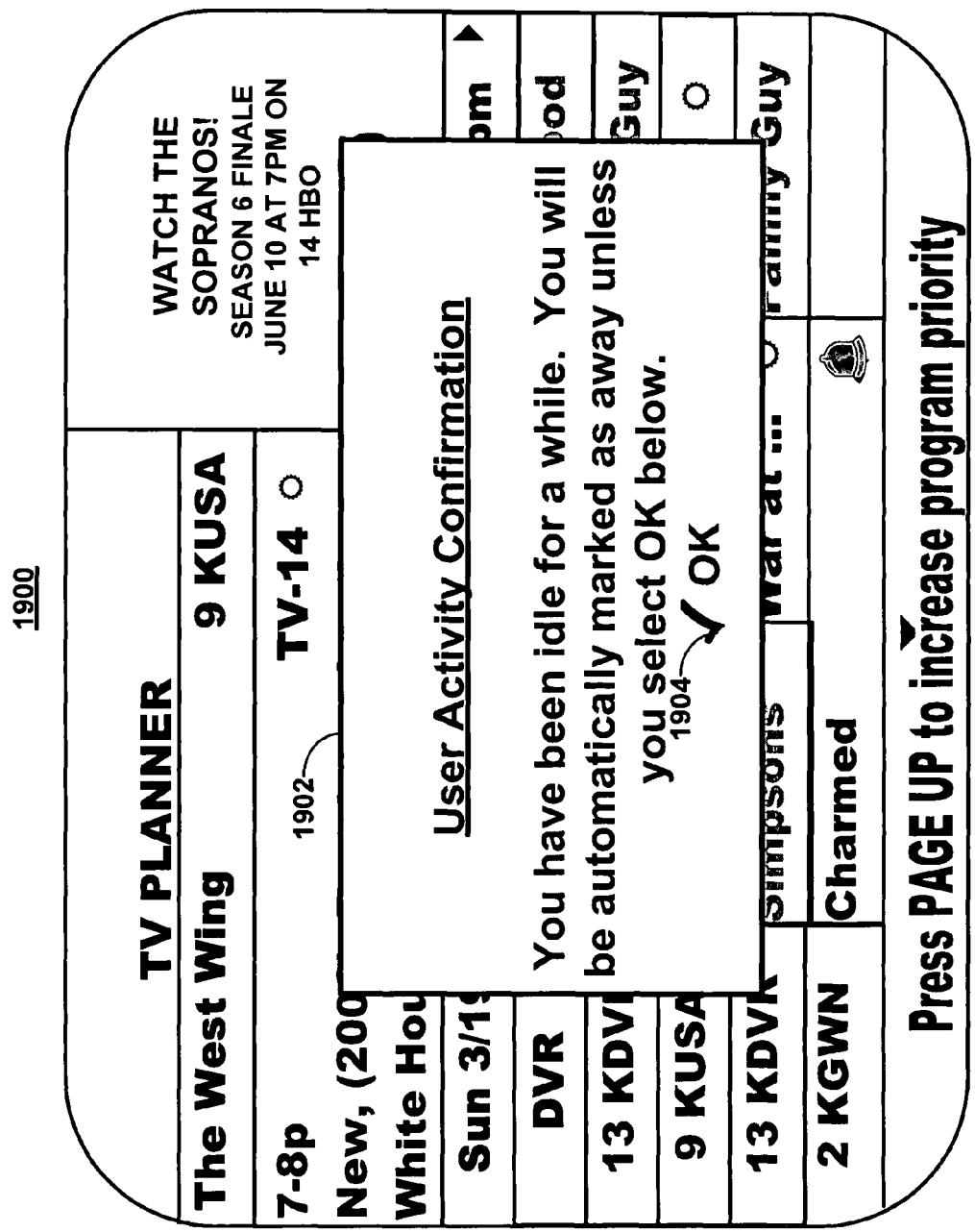
FIG. 19 shows an illustrative user activity prompt in accordance with one embodiment of the invention.

In some embodiments, the interactive media guidance application may optionally bring up a dialog or overlay for the user to indicate presence or activity. Display screen 1900 of FIG. 19 shows such a user activity confirmation. Activity confirmation overlay 1902 may be displayed at any suitable time after the user has been idle for a predetermined length of time. Although in some embodiments, the predetermined length of time may be configurable by the user, typically this length of time will be longer than the maximum duration of media content available within the media system so as to minimize the display of activity confirmation overlay 1902 when the user is, in fact, not idle. For example, the predetermined length of time may be set to 3 hours in some embodiments. The user may select confirmation selection 1904 in order to restart the idle timer.

Activity confirmation overlay 1902 may be similar to the dialogue and overlay used in SDV systems. If a user fails to acknowledge the dialog, the interactive media guidance application may go ahead and record all programs the user has set a reminder for as well as all episodes of series that the user has watched in the past. In this way, the interactive media guidance application can proactively record certain programs without any express instruction from the user to record the programs.

The priority of programs that are automatically recorded based on user history may be set low relative to other recordings that have explicitly been scheduled or relative to the automatic recording of a program for which a reminder has been set. Similarly, the recording's "keep" priority may be set low relative to programs the user has explicitly scheduled for recording. In this way, recordings of interest that are more likely to be actually viewed by the user are not overwritten by recordings made by the system. A recordings listing page (not shown) may display the difference in priority (e.g., in the recorded assets list) and/or distinguish those recordings that are the result of a user's explicit request, a reminder, or a user profile or user history analysis.

Figure 20:
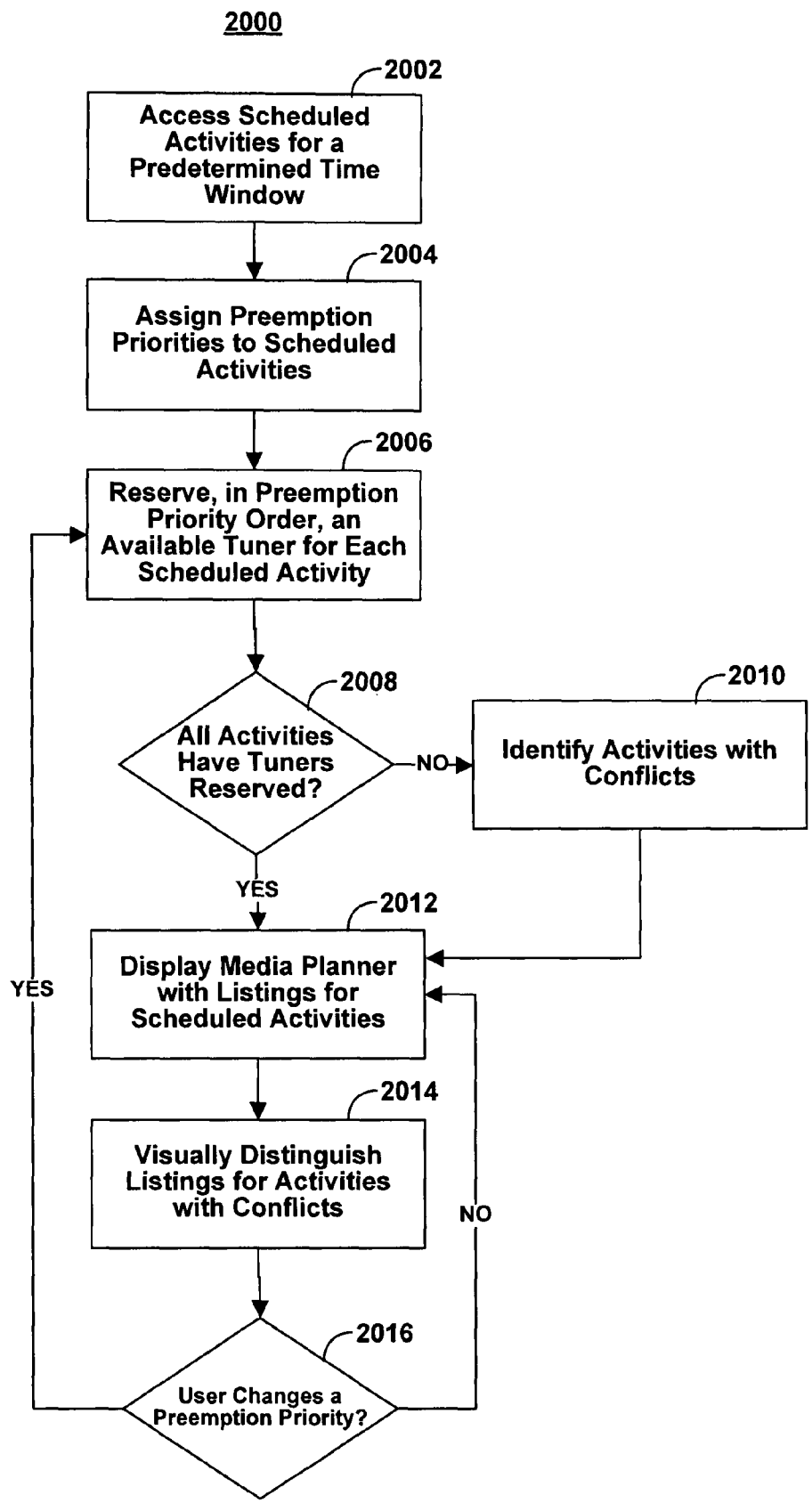
FIGS. 20, 21A, 21B, 21C, 21D, 22, 23A, and 23B show illustrative processes for planning a user's media content viewing and scheduling conditional media guidance application functions in accordance with various embodiments of the invention.

FIG. 20 shows illustrative process 2000 for displaying an interactive media planner. At step 2002, interactive media guidance application 106 (FIG. 1) may identify media content activities scheduled within a predetermined time window. For example, all scheduled recordings and reminders set within a two-hour time period may be identified. These recordings and reminders may be stored in a table (or other suitable data structure) in memory (not shown) of control circuitry 114 (FIG. 1) or on storage device 110 (FIG. 1). At step 2004, preemption priorities may be assigned to each scheduled activity that requires an available tuner. Interactive media guidance application 106 (FIG. 1) may determine the number of tuners 115 (FIG. 1) within user equipment device 102 (FIG. 1) and then reserve, at step 2006, an available tuner for each scheduled activity that requires an available tuner. The tuner reservations may be made in order of the preemption priority assigned to the scheduled activities at step 2004. For example, in some embodiments, scheduled recordings may be assigned higher priorities than reminders. The preemption priority may be a function of the position of the scheduled activity in the media planner grid.

At step 2008, interactive media guidance application 106 (FIG. 1) may determine if all scheduled activities have reserved tuners. For example, if the number of scheduled activities requiring an available tuner is less than or equal to the total number of tuners 115 (FIG. 1) within user equipment device 120 (FIG. 1), then all scheduled activities may have tuners reserved. If the total number of tuners 115 (FIG. 1) within user equipment device 120 (FIG. 1) is less than the number of scheduled activities requiring an available tuner, then the activities with conflicts may be determined at step 2010. For example, one or more of the activities with the lowest assigned preemption priorities may be designated as conflict activities at step 2010.

At step 2012, an interactive media planner may be displayed with a listing for each activity scheduled within the predetermined time window. For example, media planner display screen 1400 (FIG. 14) with media planner grid 1410 (FIG. 14) may be displayed. At step 2014, listings for activities with conflicts may be visually distinguished from listings for activities without conflicts. For example, listings with conflicts may be disabled, displayed in a different font color, a different font size, or an icon indicating the conflict may be displayed within the listings with conflicts. Any other way to visually distinguish the listings with conflicts may also be used. The user may then be allowed to change the preemption priorities of any of the displayed listings.

At step 2016, if the user changes a preemption priority, interactive media guidance application 106 (FIG. 1) may reassign tuners to the scheduled activities based on the new preemption priorities of the scheduled activities. For example, a user may increase the preemption priority of a scheduled activity with a conflict above that of a scheduled activity without a conflict. The media planner display may then be automatically refreshed to reflect the new preemption priorities and the new activities with conflicts.

In practice, one or more steps shown in process 2000 may be combined with other steps, performed in any suitable order, performed in parallel (e.g., simultaneously or substantially simultaneously), or removed.

FIGS. 21A, 21B, 21C, and 21D show illustrative process 2100 for supporting a coming-soon feature. At step 2102, a coming-soon announcement for upcoming programming may be received by the user equipment device. For example, as shown in FIG. 2, coming-soon sources 202 may utilize one or more of web scripting engine 204, remote API function calls 206, and FTP upload module 208 in order to transmit coming-soon announcements over network 210 to a supplemental data source, such as supplemental data source 120. These announcements may then be sent to a plurality of user equipment devices, such as user equipment device 102 (FIG. 1). Alternatively, coming-soon announcements may be sent directly to the user equipment devices (e.g., via a multicast transmission protocol), if desired. In some embodiments, the format of the coming-soon announcements may take the form shown in FIG. 3. The announcements may be associated with assets available outside the current window of available program schedule data used to display program schedule listings on the user equipment device. For example, program schedule data may be downloaded for content available within a fourteen-day window. This window may be the current program schedule window. Coming-soon announcements may identify assets available outside this program schedule window.

At step 2104, interactive media guidance application 106 (FIG. 1) may determine if the update flag for the received announcement is set. For example, there may be an update tag defined in the coming-soon announcement (e.g., in XML file 300). This flag or tag may indicate that the received announcement is an update as opposed to an original announcement. If the update flag is set at step 2104, the updated announcement data may be read at step 2106. If the update flag is not set, the announcement may be parsed at step 2108. At step 2110, a coming-soon record may then be updated or created in an announcement database stored at the user equipment device. For example, the announcement database may be stored in storage device 110 (FIG. 1). The coming-soon record may store some or all of the announcement data contained in the coming-soon announcement.

If the user requests to display a coming-soon list at step 2112, all the coming-soon records in the announcement database may be read at step 2114. For example, the user may select coming-soon option 402 from search menu display screen 400 (FIG. 4) in order to display a list of coming-soon attractions. The illustrative process may continue in FIG. 21B.

At step 2116, an interactive coming-soon list may be displayed to the user. For example, coming-soon display screen 500 (FIG. 5) may be displayed. If a user selects an asset in the interactive coming-soon list at step 2118, interactive media guidance application 106 (FIG. 1) may determine if the selected asset is a broadcast asset or on-demand asset at step 2120. If the selected asset is a broadcast asset, a summary information display screen may be displayed at step 2122 with record, remind, and preview options. If the selected asset is an on-demand asset, a summary information display screen may be displayed at step 2124 with remind, bookmark, and preview options.

If the user does not select an asset in the interactive coming-soon list at step 2118, interactive media guidance application 106 (FIG. 1) may determine if the user has selected one or more coming-soon sources at step 2126. Alternatively, the user may select a coming-soon source before selecting an asset in the interactive coming-soon list. For example, the user may bring up coming-soon selection overlay 802 (FIG. 8). If the user selects one or more coming-soon sources, at step 2128 the coming-soon records associated with the selected source or sources are read. The interactive coming-soon list is then refreshed at step 2130 with only the listings for coming-soon content associated with the selected source or sources.

Figure 21A:
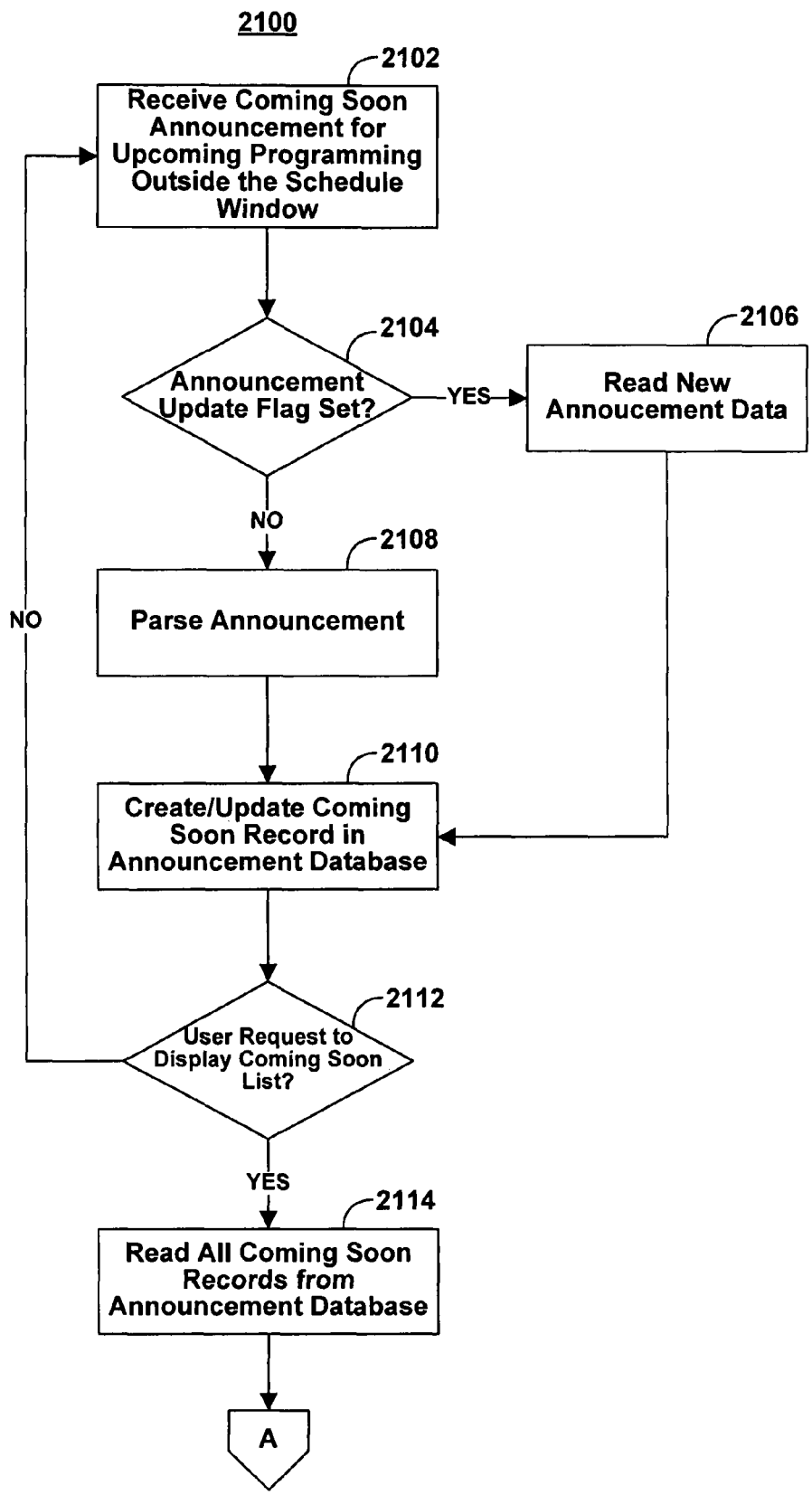
Figure 21B:
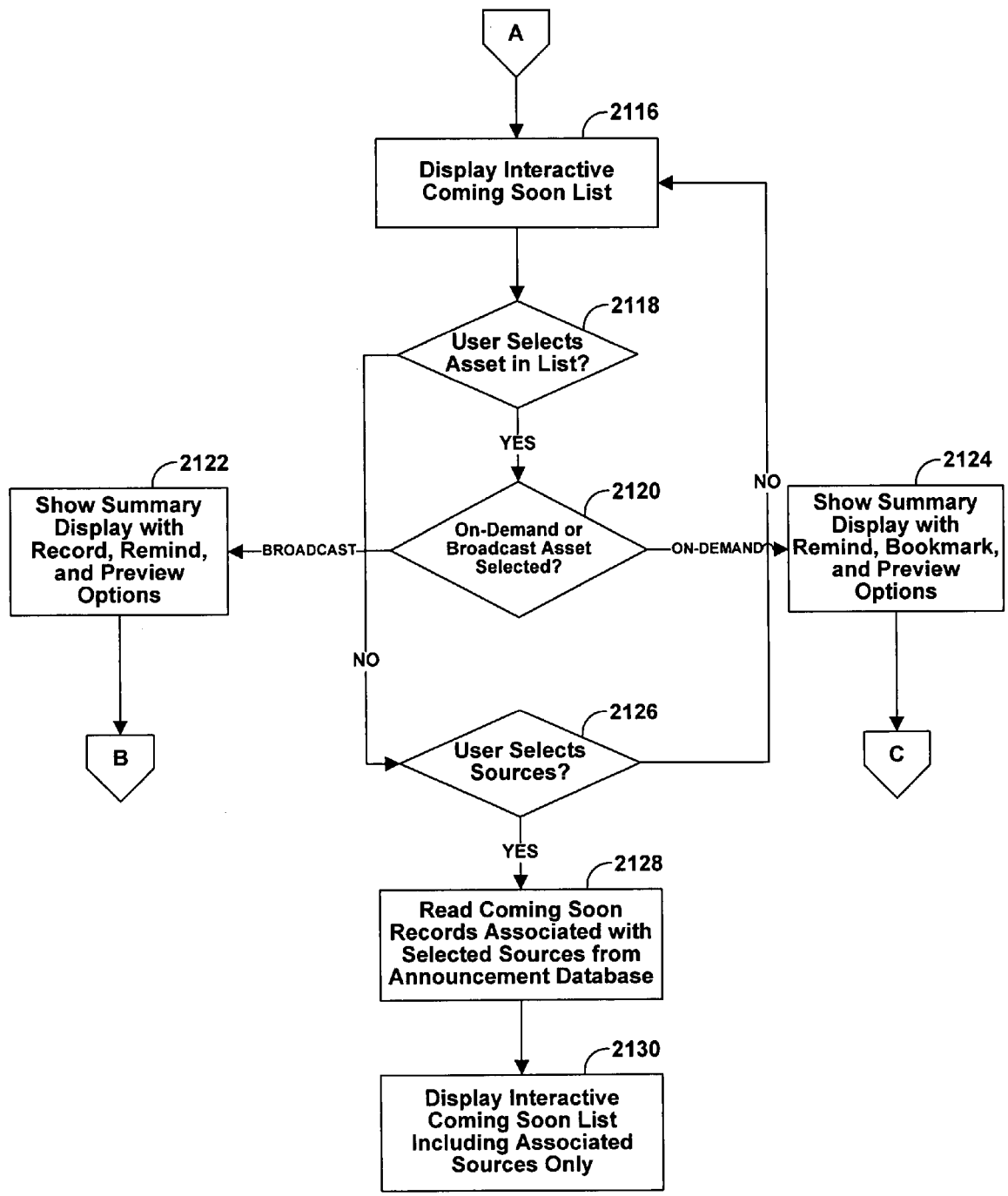
Figure 21C:
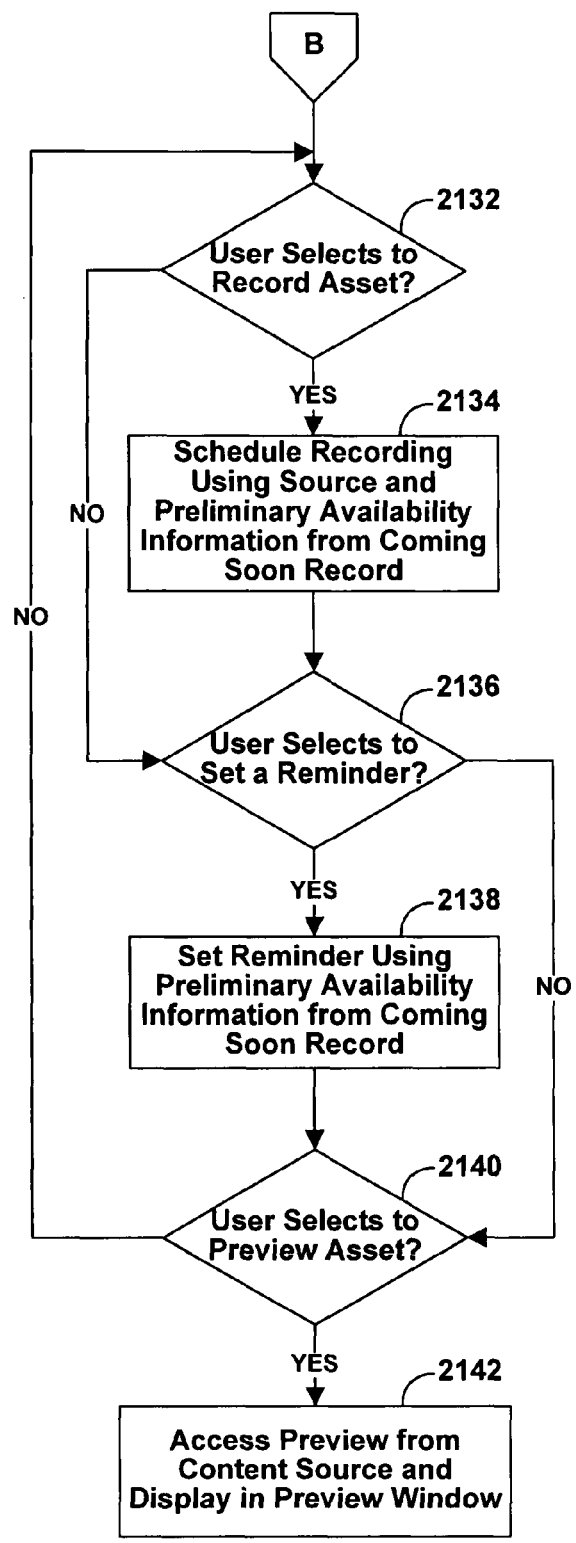

After the summary information display screen for a broadcast asset is displayed at step 2122, the illustrative process may continue in FIG. 21C. If the user selects to record the selected asset at step 2132 (for example by clicking on record option 610 of FIG. 6), a recording may be scheduled at step 2134. The recording may be scheduled using the preliminary availability information from the coming-soon record. For example, the projected broadcast date and/or time may be used to schedule the recording. This information may be included in the coming-soon announcement, as shown in FIG. 3. In some embodiments, rather than scheduling the recording at the time of the request, the interactive media guidance application may record the request and schedule the recording at the time the final schedule information is received for the program at a later date. In some embodiments, rather then schedule the coming-soon asset for recording, the coming-soon asset may be tagged with an "interested in recording" or related interest tag. This tag may be used by the system to remind the user at a later date to make a decision related to the asset once more information is known about the asset. If the user does not select to record the asset at step 2132, interactive media guidance application 106 (FIG. 1) may then determine if the user has selected to set a reminder for the broadcast asset at step 2136. For example, the user may select reminder option 608 (FIG. 6) to set a reminder. If the user selects to set a reminder, a reminder may be set at step 2138 using the preliminary availability information from the coming-soon record. For example, the projected broadcast date and/or time may be included in the coming-soon announcement, as shown in FIG. 3. This information may be used to set the reminder. In some embodiments, rather than scheduling the reminder at the time of the request, the interactive media guidance application may record the request and schedule the reminder at the time the final schedule information is received for the program at a later date.

Finally, the user may select to view a preview of the broadcast asset at step 2140. If the user selects to view a preview of the broadcast asset, a full-motion video preview of the asset may be accessed and displayed at step 2142. In some embodiments, the preview may be accessed from a suitable content source that delivers previews for broadcast programming (e.g., one of data sources 140 of FIG. 1). The video preview may also be made available on a supplemental data source (e.g., supplemental data source 120 of FIG. 1, if desired). The preview may be displayed in a preview window or in any suitable location with the coming-soon listing. For example, the preview may be displayed in PIG windows 514 (FIG. 5), 616 (FIG. 6), or 720 (FIG. 7).

Figure 21D:
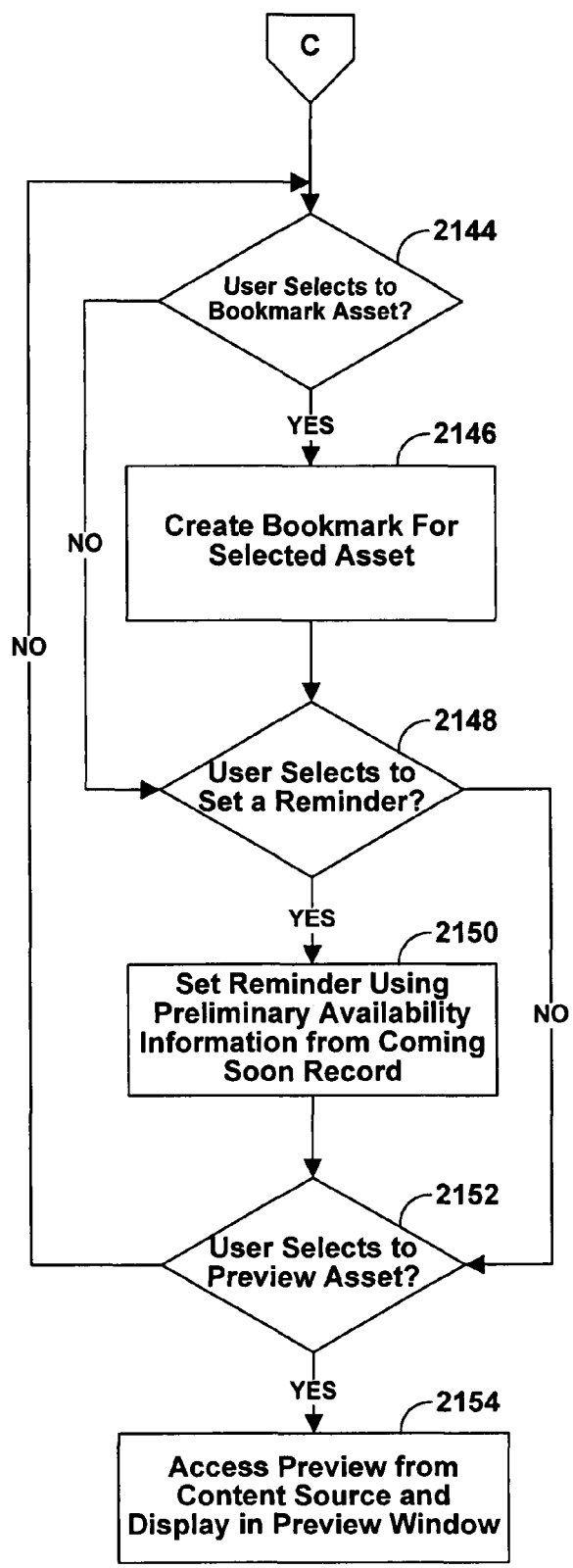

After the summary information display screen for an on-demand asset is displayed at step 2124, the illustrative process may continue in FIG. 21D. If the user selects to create a bookmark for the selected asset at step 2144 (for example by clicking on bookmark option 716 of FIG. 7), a bookmark for the on-demand asset may be created at step 2146. If the user does not select to bookmark the asset at step 2144, interactive media guidance application 106 (FIG. 1) may then determine if the user has selected to set a reminder for the broadcast asset at step 2148. For example, the user may select reminder option 712 (FIG. 7) to set a reminder. If the user selects to set a reminder, a reminder may be set at step 2150 using the preliminary availability information from the coming-soon record. For example, the projected broadcast date and/or time may be included in the coming-soon announcement, as shown in FIG. 3. This information may be used to set the reminder. In some embodiments, rather than scheduling the reminder at the time of the request, the interactive media guidance application may record the request and then, at the time the program becomes available on-demand it may display the reminder to the user. In some embodiments, for VOD coming-soon assets, the date and time for a reminder (or optionally a planned viewing date and time) may be set, in some cases constrained to the period of availability of the asset, if present in the coming-soon data record.

Finally, the user may select to view a preview of the broadcast asset at step 2152. If the user selects to view a preview of the on-demand asset, a full-motion video preview of the asset may be accessed and displayed at step 2154. In some embodiments, the preview may be accessed from a suitable content source that delivers previews for on-demand programming (e.g., one of data sources 140 of FIG. 1). The video preview may also be made available on a supplemental data source (e.g., supplemental data source 120 of FIG. 1, if desired). The preview may be displayed in a preview window or in any suitable location with the coming-soon listing. For example, the preview may be displayed in PIG windows 514 (FIG. 5), 616 (FIG. 6), or 720 (FIG. 7).

In practice, one or more steps shown in process 2100 may be combined with other steps, performed in any suitable order, performed in parallel (e.g., simultaneously or substantially simultaneously), or removed.

Figure 22:
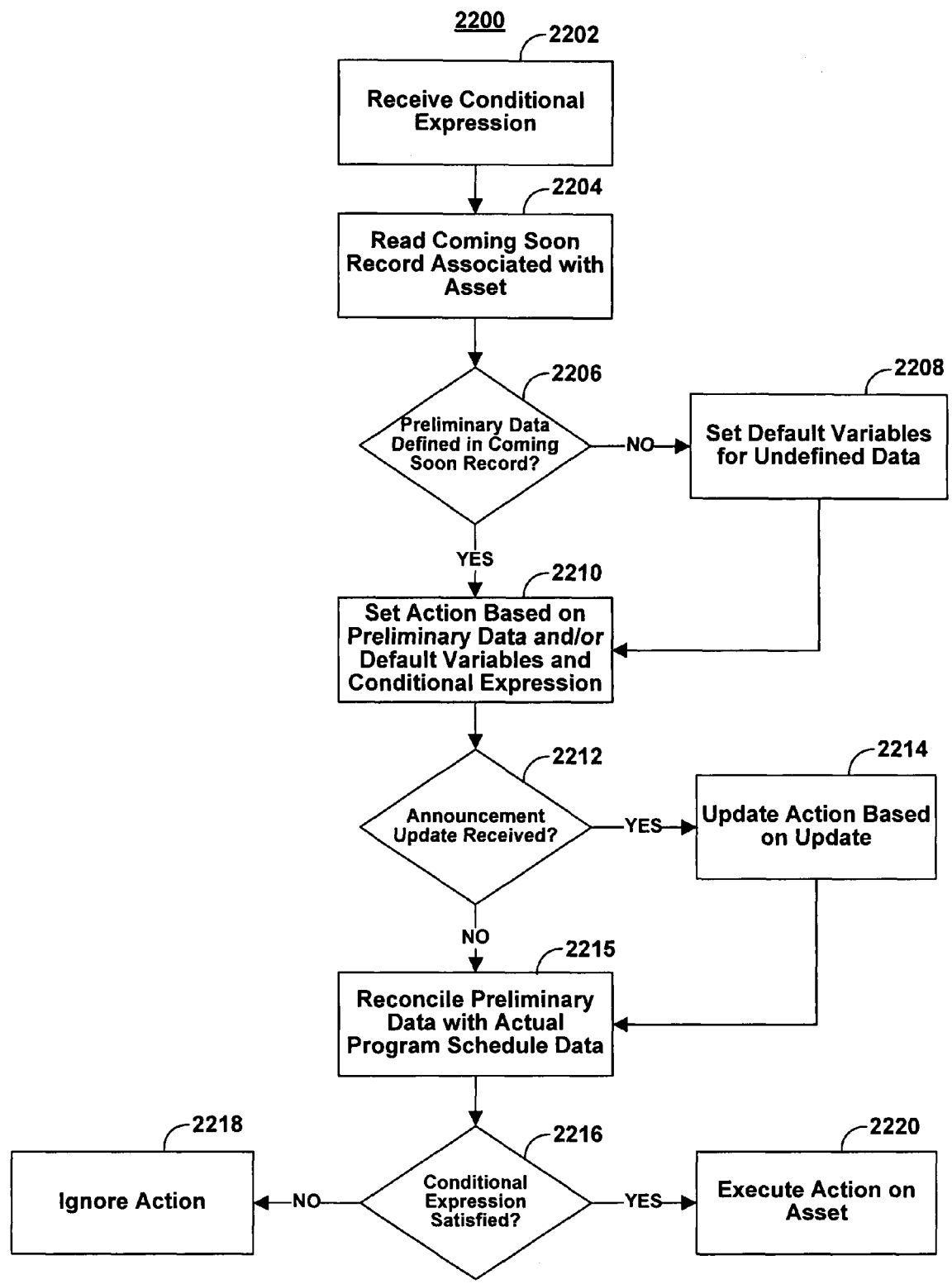

FIG. 22 shows illustrative process 2200 for scheduling or executing a conditional action for a coming-soon asset. Because coming-soon assets are often associated with preliminary data (including availability information, such as scheduled availability date and/or time) that is subject to change, conditional actions allow a user to condition the execution of a media guidance application function on one or more conditional statements being true at the program runtime (e.g., at the asset's actual availability date and time) or at any suitable time prior to the program runtime (e.g., when the listings data has been completely received or when sufficient information has been received to disambiguate the action). Conditional actions may be useful to a user who wants to perform some media guidance application function on an asset only under particular circumstances.

At step 2202, a conditional expression is received. For example, the user may input a simple or compound conditional statement using conditional action overlay 1002 (FIG. 10) or overlay 1102 (FIG. 11) from a coming-soon display screen, such as display screen 1000 (FIG. 10) or 1100 (FIG. 11). A user may also set up a conditional action from any other display screen shown herein. In some embodiments, the user may be presented with a list of predefined conditional expressions to choose from. At step 2204, the coming-soon record associated with the asset may be read. For example, as previously described in regard to FIG. 3, some or all of the data in a coming-soon announcement may be saved to storage device 110 (FIG. 1) within user equipment device 102 (FIG. 1) in the form of a coming-soon record. This record may store, for example, preliminary availability data, ratings information, access price information, genre information, cast member information, or any other suitable data associated with the asset. Some or all of this data may be subject to change.

At step 2206, interactive media guidance application 106 (FIG. 1) may determine if the necessary preliminary data is defined in the coming-soon record. For example, to schedule a recording for the coming-soon announcement, at least the source (e.g., channel), date, and time may be required variables. If these variables are not defined in the coming-soon record, interactive media guidance application 106 (FIG. 1) may set default, placeholder variables for these undefined variables at step 2208. Then, at step 2210, the conditional action may be scheduled based on the preliminary data and/or the default variables set by interactive media guidance application 106 (FIG. 1) as well as the conditional expression received at step 2202. For example, a recording of the asset may be conditioned on the asset having a particular access price (or range of access prices), as shown in FIG. 10. Other illustrative conditions may include the rating of the asset (e.g., its MPAA rating), a user or editorial rating of the asset (e.g., using a star rating system), the cast members, the teams or players (for sporting events), or any other suitable attribute of the asset.

In some embodiments, a conditional expression may include one or more conditional statements based on the activity of other users in media system 100 (FIG. 1). For example, in an SDV environment, an SDV manager may maintain a table of user viewing activity as well as conditional actions set up by all users of the SDV service group. In other environments, a channel change monitoring mechanism or service may maintain a table of user viewing activity as well as conditional actions set up by all users of the media system (or all users in a local subnet or geographical region). In other embodiments, an on-demand server may track the viewing statistics for individual on-demand assets. A user may then create a conditional action based on the number (or percentage) of users performing a related activity or whether or not the asset is currently allocated within the network. For example, a user may select to record an asset only if at least 90% of other users (e.g., in the SDV service group, local subnet, or geographical region) have also scheduled the same asset for recording. As another example, a user may set a conditional action based on the percentage of other users rating the asset in a particular way. For example, the user may schedule the asset for recording only if at least 80% of other users (e.g., in the SDV service group, local subnet, or geographical region) have rated the asset with a 3 star rating or higher (or the editorial rating is a 3 star rating or higher). Any other action conditioned on other rating schemes may also be created and scheduled.

Because the action may be conditioned on preliminary data that may not yet be completely available or that may be subject to change or revision, if an announcement update is received at step 2212, the conditional action may be updated (if needed) at step 2114. For example, the update flag shown in XML file 300 (FIG. 3) may be set to indicate a coming-soon announcement update. The update may include updated availability data (or any other suitable attribute, such as access price or rating) for the asset. At some later time, the coming-soon asset may actually be included in the downloaded window of program schedule data. For example, as previously described, typical systems may download program schedule data associated with programming available within a program schedule listings window. This window is generally short (e.g., two weeks) and the schedule data for programming available within this window may be downloaded at any suitable time (e.g., every two weeks or every day). At step 2215, interactive media guidance application 106 (FIG. 1) may reconcile scheduled conditional actions with the actual data received for the coming-soon asset when it enters the program schedule window and is included in the regular program schedule database. A unique program identifier may be defined in the coming-soon announcement (e.g., XML tag 300 of FIG. 3) and may be compared to the program identifiers of the programs identified in the program schedule database. If the program identifiers match, this may indicate to interactive media guidance application 106 (FIG. 1) that the coming-soon asset has now entered the current program schedule window. In some embodiments, any conflicting information between the downloaded program schedule data and the coming-soon data may be reconciled in favor of the program schedule data that is used for displaying program schedule listings on user equipment device 102 (FIG. 1).

At step 2216, interactive media guidance application 106 (FIG. 1) may determine if the conditional expression is satisfied. For example, just prior to the actual execution of the conditional action, the conditional expression may be reevaluated based on the asset's final attributes. If the conditional expression is still satisfied, then at step 2220 the action may be executed on the asset. If the conditional expression is not satisfied, then at step 2218 the action may be skipped or ignored.

For example, a user may create a conditional action to record a sporting event if a particular athlete or team is playing in the sporting event. Just before the sporting event is broadcast (or at any suitable time before broadcast), interactive media guidance application 106 (FIG. 1) may determine which athletes and teams are playing. The athletes and teams who are playing may be derived from extended media guidance application data received from a suitable data source (e.g., one of data sources 140 (FIG. 1) or supplemental data source 120 (FIG. 1)). If the selected athlete or team is actually playing, the conditional action may be executed (for example, the coming-soon asset may be recorded); otherwise, the action may be ignored. Any other suitable content attributes may also be used in simple or complex conditional expressions associated with the conditional action.

In practice, one or more steps shown in process 2200 may be combined with other steps, performed in any suitable order, performed in parallel (e.g., simultaneously or substantially simultaneously), or removed.

Figure 23A:
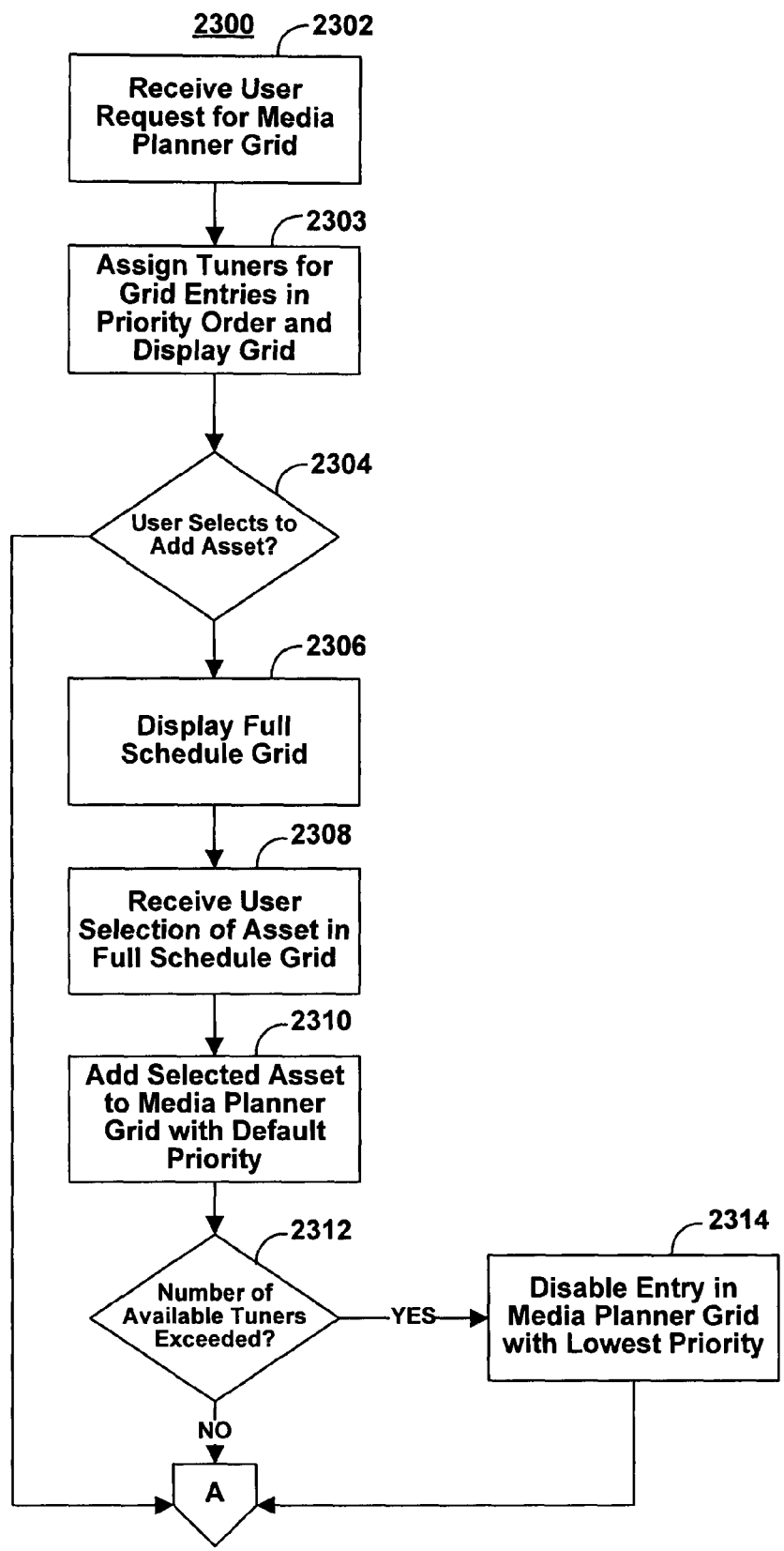
Figure 23B:
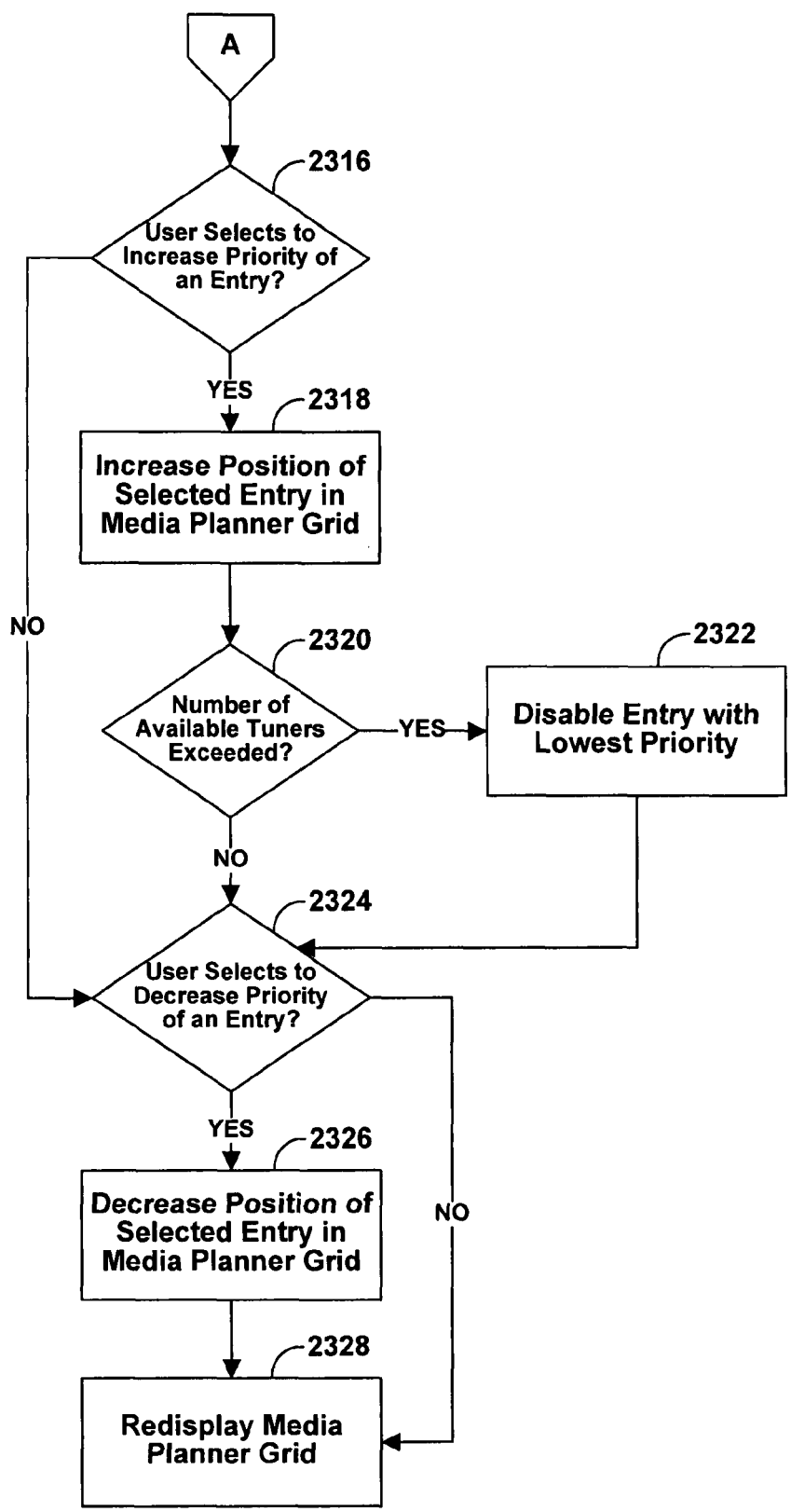

FIGS. 23A and 23B show illustrative process 2300 for displaying and supporting a media planner grid. At step 2302, a user request for the media planner grid may be received. For example, the user may select planner option 404 (FIG. 4) to display media planner display screen 1400 (FIG. 14). As shown in FIG. 14, a media planner grid for Sunday, March 19 is shown from 7:00 to 8:30 PM. The user may change the date and/or time by pressing the left and right arrow keys on an input device (e.g., input device 108 (FIG. 1). The user may also use overlays 1202 (FIG. 12) and 1302 (FIG. 13) to select a desired date or time window.

The interactive media planner grid may show all programs scheduled for recording and/or with reminders set during the displayed grid time window. The interactive media planner grid may also show programming that is not associated with any automatic media guidance application function, but the user has expressed an interest in or would like to watch at the planned date and time anyway. For example, the user may wish to watch "The Sopranos" on HBO during its weekly broadcast time, but not schedule a recording or set a reminder for the show. These "tagged" assets may all be identified in some way (either manually by the user or automatically by the interactive media guidance application) as assets the user is interested in watching or recording on a particular date and at a particular time. These assets of interest are said to be tagged relative to a particular date and time (e.g., the planned viewing date and time, the planned reminder date and time, or the planned recording date and time). For example, in some embodiments, all assets scheduled for recording on the system (either manually by the user or automatically through, for example, a series recording) are automatically tagged. Assets with reminders set, assets scheduled for automatic tuning or display at a particular time, and/or assets with bookmarks set (that are available during the planning window) may also be considered "tagged." The user may access his or her media planner grid at any time in order to view a listing of planned viewing activities (e.g., all tagged assets). The user may then select any listing in the media planner grid to tune to that content, display a screen of additional information about the content, adjust the listing's priority, schedule the viewing activity for an earlier time (e.g., by dragging the listing left), schedule the viewing activity for an later time (e.g., by dragging the listing right), extend or shorten its viewing time, split its planned viewing time into two or more parts, or toggle its recording or reminder status.

In displaying the media planner grid, the interactive media guidance application may access data identifying the total number of tuners 115 (FIG. 1) available within user equipment device 102 (FIG. 1). The interactive media guidance application may then assign or reserve a tuner for each entry scheduled for recording or viewing in the media planner grid at step 2303. If the user has planned more viewing activities than available tuners, then tuners may be assigned to entries in the media planner grid in priority order. The entries without a reserved tuner may be automatically disabled when the media planner grid is displayed.

The user may also select to add a new asset to the user's media planner grid. If the user requests to add a new asset at step 2304, the full schedule grid (e.g., the full media guidance application program schedule guide) or other program selection screen may be displayed to the user at step 2306. The user may then select any asset within the full grid at step 2308 (e.g., tag the asset with one or more "interest" tags, such as interested in recording or viewing), and a new listing for the selected asset may be displayed in the user's media planner application grid at step 2310. If desired, recorded or on-demand assets may be added to the media planner grid manually. In media planner display screen 1400 (FIG. 14), the user may have just selected to add "The West Wing" listing. In some embodiments, this listing is displayed with default priority (e.g., the listing is displayed near the middle of the grid).

At step 2312, interactive media guidance application 106 (FIG. 1) may determine if the number of available tuners has been exceeded by the addition of the new asset. For example, if user equipment device 102 (FIG. 1) has three available tuners 115 (FIG. 1) and three programs are already scheduled for recording, a conflict may be signaled. If the number of tuners has been exceeded, the entry in the media planner grid with the lowest priority may be disabled, marked in a special way, (or removed from the grid) at step 2314. For example, the listing may appear grayed out or otherwise visually distinguished from the other listings in the grid. In some embodiments, an icon (or a modification of an existing icon) may additionally or alternatively be shown next to or within listings that cannot be tuned due to a lack of available tuners.

Illustrative process 2300 continues in FIG. 23B. If the user selects to increase the priority of an entry shown in the media planner grid at step 2316, then the position of the selected entry in the grid may be increased at step 2318. In some embodiments, the position of a listing within the media planner grid determines the listing's priority. For example, as shown in media planner display screen 1400 (FIG. 14), the listing for "Charmed" may be associated with the highest priority, the listing for the "The Sopranos" may be associated with the next highest priority, and so on. At step 2320, interactive media guidance application 106 (FIG. 1) may determine if the number of available tuners has been exceeded by the increase in priority, or if a change in tuner assignments is required. For example, if user equipment device 102 (FIG. 1) has three available tuners 115 (FIG. 1) and three programs with higher priority are already scheduled for recording, a conflict may be signaled. If the number of tuners has been exceeded, the entry in the media planner grid now with the lowest priority may be disabled (or removed from the grid) at step 2322. For example, the listing may appear grayed out or otherwise visually distinguished from the other listings in the grid. In some embodiments, an icon may additionally or alternatively be shown or modified next to or within listings that cannot be tuned due to a lack of available tuners.

If the user selects to decrease the priority of an entry within the media planner grid at step 2324, then the position of the selected entry in the grid may be decreased at step 2326. After the position of the selected entry has been decreased at step 2326, or if the user does not select to decrease the priority of an asset at step 2324, the media planner grid may be redisplayed at step 2328. Users may increase or decrease a listing's priority by dragging the listing up or down within the media planner grid or highlighting a listing and selecting a "PAGE UP" or "PAGE DOWN" button (or other suitable button) on input device 108 (FIG. 1).

In practice, one or more steps shown in process 2300 may be combined with other steps, performed in any suitable order, performed in parallel (e.g., simultaneously or substantially simultaneously), or removed.

The above described embodiments of the invention are presented for purposes of illustration and not of limitation, and the present invention is limited only by the claims which follow.

What is claimed is:

1. A method for executing a conditional media guidance application function on a media asset available outside the current program schedule window, the method comprising:

receiving program schedule data, wherein the program schedule data is associated with media content available within a current program schedule window;

receiving anticipated information for a media asset available outside the current program schedule window;

displaying an interactive element for the media asset available outside the current program schedule window, wherein the interactive element comprises at least some of the received anticipated information;

scheduling a conditional media guidance application function for the media asset available outside the current program schedule window, the conditional media guidance application function being conditioned on an expression that includes a participant associated with the media asset that is not completely known before the media asset enters the current program schedule window or that is subject to change or revision;

determining when the media asset enters the current program schedule window;

determining if the expression of the conditional media guidance application function is satisfied after determining the media asset has entered the current program schedule window; and in response to determining that the expression is satisfied, executing the conditional media guidance application function.

2. The method of claim 1 wherein determining when the media asset enters the current program schedule window comprises accessing a plurality of unique program identifiers associated with media content in the current program schedule window.

3. The method of claim 2 wherein determining when the at least one media asset enters the current program schedule window further comprises comparing a unique program identifier associated with the media asset to the plurality of unique program identifiers.

4. The method of claim 1 wherein the media asset available outside the current program schedule window comprises a broadcast media asset, and the anticipated information comprises an anticipated broadcast date.

5. The method of claim 1 wherein the media asset available outside the current program schedule window comprises an on-demand media asset, and the anticipated information comprises an anticipated release date.

6. The method of claim 1 wherein the interactive element is selected from the group consisting of an interactive advertisement and an interactive listing.

7. The method of claim 1 further comprising displaying an indication of the reliability of the anticipated information in the displayed interactive element.

8. The method of claim 7 wherein the indication of the reliability of the anticipated information comprises an icon.

9. The method of claim 1 wherein the conditional media guidance application function is selected from the group consisting of scheduling a recording of the media asset available outside the current program schedule window, recording the media asset available outside the current program schedule window, setting a reminder for the media asset available outside the current program schedule window, tuning the media asset available outside the current program schedule window, displaying the media asset available outside the current program schedule window, and ordering the media asset available outside the current program schedule window.

10. The method of claim 1 wherein the expression further includes at least one of a user rating, a network popularity, an MPAA rating, a television rating, a broadcast date, a broadcast time, a release date, a release time, an actor, a cast member, a director, an access price, and a format type.

11. The method of claim 1 wherein the media asset available outside the current program schedule window comprises a sporting event or a sporting tournament, and the participant includes at least one of a team appearing in the sporting event or the sporting tournament and an athlete appearing in the sporting event or the sporting tournament.

12. The method of claim 1 further comprising:
receiving updated anticipated information; and
automatically updating the displayed anticipated information in the interactive element in response to receiving the updated anticipated information.

13. The method of claim 1 wherein the expression comprises a complex logic expression including the anticipated information.

14. The method of claim 1 further comprising:
receiving at least one content control flag associated with the media asset available outside the current program schedule window;
saving the at least one content control flag; and
enforcing at least one copyright restriction on the media asset, wherein the copyright restriction is defined, at least in part, by the at least one content control flag.

15. The method of claim 14 wherein enforcing at least one copyright restriction on the media asset comprises prohibiting copying of the media asset.

16. The method of claim 14 wherein enforcing at least one copyright restriction on the media asset comprises prohibiting recording of the media asset.

17. The method of claim 14 wherein enforcing at least one copyright restriction on the media asset comprises prohibiting editing of the media asset.

18. The method of claim 14 wherein enforcing at least one copyright restriction on the media asset comprises prohibiting retransmission of the media asset.

19. The method of claim 1 wherein receiving anticipated information for a media asset available outside the current program schedule window comprises receiving anticipated information for a media content package comprising at least two media assets.

20. The method of claim 19 further comprising scheduling a first conditional media guidance application function relating to a first media asset in the media content package and scheduling a second conditional media guidance application function relating to a second media asset in the media content package, wherein the first and second conditional media guidance application functions are different functions.

21. The method of claim 1 wherein receiving anticipated information for a media asset available outside the current program schedule window comprises receiving an estimated date.

22. The method of claim 1 further comprising determining if a conditional expression for the plurality of content attributes is satisfied after determining the media asset has entered the current program schedule window.

23. The method of claim 1 further comprising:
receiving updated information; and
updating the conditional media guidance application function based on the received updated information.

24. A system for executing a conditional media guidance application function on a media asset available outside the current program schedule window, the system comprising:
memory to store program schedule data;
a display device; and control circuitry configured to:
receive the program schedule data, wherein the program schedule data is associated with media content available within a current program schedule window;
receive anticipated information for a media asset available outside the current program schedule window;
display, on the display device, an interactive element for the media asset available outside the current program schedule window, wherein the interactive element comprises at least some of the received anticipated information;
schedule a conditional media guidance application function relating to the media asset available outside the current program schedule window, the conditional media guidance application function being conditioned on an expression that includes a participant associated with the media asset that is not completely known before the media asset enters the current program schedule window or that is subject to change or revision;
determine when the media asset enters the current program schedule window;
determine if the expression of the conditional media guidance application function is satisfied after determining the media asset has entered the current program schedule window and
in response to determining that the expression is satisfied, execute the conditional media guidance application function.

25. The system of claim 24 wherein the control circuitry is configured to determine when the media asset enters the current program schedule window by accessing a plurality of unique program identifiers associated with media content in the current program schedule window.

26. The system of claim 25 wherein the control circuitry is configured to determine when the at least one media asset enters the current program schedule window further by comparing a unique program identifier associated with the media asset to the plurality of unique program identifiers.

27. The system of claim 24 wherein the media asset available outside the current program schedule window comprises a broadcast media asset, and the anticipated information comprises an anticipated broadcast date.

28. The system of claim 24 wherein the media asset available outside the current program schedule window comprises an on-demand media asset, and the anticipated information comprises an anticipated release date.

29. The system of claim 24 wherein the interactive element is selected from the group consisting of an interactive advertisement and an interactive listing.

30. The system of claim 24 wherein the control circuitry is further configured to display an indication of the reliability of the anticipated information in the displayed interactive element.

31. The system of claim 30 wherein the indication of the reliability of the anticipated information comprises an icon.

32. The system of claim 24 wherein the conditional media guidance application function is selected from the group consisting of scheduling a recording of the media asset available outside the current program schedule window, recording the media asset available outside the current program schedule window, setting a reminder for the media asset available outside the current program schedule window, tuning the media asset available outside the current program schedule window, displaying the media asset available outside the current program schedule window, and ordering the media asset available outside the current program schedule window.

33. The system of claim 24 wherein the expression further includes at least one of a user rating, a network popularity, an MPAA rating, a television rating, a broadcast date, a broadcast time, a release date, a release time, an actor, a cast member, a director, an access price, and a format type.

34. The system of claim 24 wherein the media asset available outside the current program schedule window comprises a sporting event or a sporting tournament, and the participant includes at least one of a team appearing in the sporting event or the sporting tournament and an athlete appearing in the sporting event or the sporting tournament.

35. The system of claim 24 wherein the control circuitry is further configured to:
receive updated anticipated information; and
automatically update the displayed anticipated information in the interactive element in response to receiving the updated anticipated information.

36. The method of claim 24 wherein the expression comprises a complex logic expression including the anticipated information.

37. The system of claim 24 wherein the control circuitry is further configured to:
receive at least one content control flag associated with the media asset available outside the current program schedule window;
save the at least one content control flag; and
enforce at least one copyright restriction on the media asset, wherein the copyright restriction is defined, at least in part, by the at least one content control flag.

38. The system of claim 37 wherein the control circuitry is configured to enforce at least one copyright restriction on the media asset by prohibiting copying of the media asset.

39. The system of claim 37 wherein the control circuitry is configured to enforce at least one copyright restriction on the media asset by prohibiting recording of the media asset.

40. The system of claim 37 wherein the control circuitry is configured to enforce at least one copyright restriction on the media asset by prohibiting editing of the media asset.

41. The system of claim 37 wherein the control circuitry is configured to enforce at least one copyright restriction on the media asset by prohibiting retransmission of the media asset.

42. The system of claim 24 wherein the control circuitry is configured to receive anticipated information for a media content package comprising at least two media assets.

43. The system of claim 42 further wherein the control circuitry is further configured to schedule a first conditional media guidance application function relating to a first media asset in the media content package and schedule a second conditional media guidance application function relating to a second media asset in the media content package, wherein the first and second conditional media guidance application functions are different functions.

44. The system of claim 24 wherein the received anticipated information comprises an estimated date.

45. The system of claim 24 wherein the control circuitry is further configured to:
determine if a conditional expression for the plurality of content attributes is satisfied after determining the media asset has entered the current program schedule window.

46. The system of claim 24 wherein the control circuitry is further configured to:
receive updated information; and
update the conditional media guidance application function based on the received updated information.

47. A method for executing a conditional media guidance application function on a media asset available outside the current program schedule window, the method comprising:

receiving program schedule data, wherein the program schedule data is associated with media content available within a current program schedule window;

receiving anticipated information for a media asset available outside the current program schedule window;

displaying an interactive element for the media asset available outside the current program schedule window, wherein the interactive element comprises at least some of the received anticipated information;

scheduling a conditional media guidance application function for the media asset available outside the current program schedule window, the conditional media guidance application function being conditioned on an expression that includes a topic of the media asset that is not completely known before the media asset enters the current program schedule window or that is subject to change or revision;

determining when the media asset enters the current program schedule window;

determining if the expression of the conditional media guidance application function is satisfied after determining the media asset has entered the current program schedule window; and in response to determining that the expression is satisfied, executing the conditional media guidance application function.

48. A system for executing a conditional media guidance application function on a media asset available outside the current program schedule window, the system comprising:

memory to store program schedule data;

a display device; and control circuitry configured to:

receive the program schedule data, wherein the program schedule data is associated with media content available within a current program schedule window;

receive anticipated information for a media asset available outside the current program schedule window;

display, on the display device, an interactive element for the media asset available outside the current program schedule window, wherein the interactive element comprises at least some of the received anticipated information;

schedule a conditional media guidance application function relating to the media asset available outside the current program schedule window, the conditional media guidance application function being conditioned on an expression that includes a topic of the media asset that is not completely known before the media asset enters the current program schedule window or that is subject to change or revision;

determine when the media asset enters the current program schedule window;

determine if the expression of the conditional media guidance application function is satisfied after determining the media asset has entered the current program schedule window and in response to determining that the expression is satisfied, execute the conditional media guidance application function.

* * * * *